United States Patent
Gray et al.

[11] Patent Number: 6,069,015
[45] Date of Patent: May 30, 2000

[54] METHOD OF FABRICATING THIN FILM MAGNETIC HEAD INCLUDING DURABLE WEAR LAYER AND NON-MAGNETIC GAP STRUCTURE

[75] Inventors: G. Robert Gray, Fremont; Arun Malhotra, San Jose, both of Calif.

[73] Assignee: AIWA Research and Development, Inc., Fremont, Calif.

[21] Appl. No.: 09/144,770

[22] Filed: Sep. 1, 1998

Related U.S. Application Data

[62] Division of application No. 08/650,587, May 20, 1996, Pat. No. 5,801,909.

[51] Int. Cl.⁷ .................... H01L 43/00; G11B 5/127
[52] U.S. Cl. .................. 438/3; 438/48; 29/603.01; 29/603.07; 360/113
[58] Field of Search .................... 438/3, 21, 48; 360/113; 29/603.01, 603.07

[56] References Cited

U.S. PATENT DOCUMENTS

| | | |
|---|---|---|
| 3,723,665 | 3/1973 | Lazzari et al. . |
| 4,340,568 | 7/1982 | Hirai et al. . |
| 4,414,554 | 11/1983 | Springer . |
| 4,470,051 | 9/1984 | Springer . |
| 4,494,125 | 1/1985 | Springer . |
| 4,503,439 | 3/1985 | Springer . |
| 4,503,440 | 3/1985 | Springer . |
| 4,517,616 | 5/1985 | Bischoff . |
| 4,539,280 | 9/1985 | Springer . |
| 4,544,421 | 10/1985 | Springer . |
| 4,639,289 | 1/1987 | Lazzari . |
| 4,675,265 | 6/1987 | Kazama et al. . |
| 4,809,103 | 2/1989 | Lazzari . |
| 4,837,924 | 6/1989 | Lazzari . |
| 4,883,773 | 11/1989 | Ishikura ........................... 438/3 |
| 4,901,177 | 2/1990 | Lazzari . |
| 4,912,584 | 3/1990 | Mallary et al. . |

(List continued on next page.)

FOREIGN PATENT DOCUMENTS 2-16373   12/1991   Japan ................. G11B 5/187

OTHER PUBLICATIONS

A. Sano, et al. "A Low Inductance Metal–In–Gap Head Using A Side–Core Concept" ©1993, IEEE Transactions on Magnetics, vol. 29, No. 6, pp. 3888–3890.

K.K. Mittal, "Factors Affecting Adhesion Of Lithographic Materials" Solid State Technology, May 1979, pp. 89–100.

J.P. Lazzari et al. "A New Thin Film Head Generation IC Head", IEEE Transactions On Magnetics, vol. 25, No. 5, Sep. 1989, pp. 3190–3193.

*Primary Examiner*—Mary Wilczewski
*Assistant Examiner*—Yung A. Lin
*Attorney, Agent, or Firm*—Skjerven, Morrill, MacPherson, Franklin & Friel, LLP; Ken Koestner

[57] ABSTRACT

A thin film magnetic head is fabricated on a substrate by depositing a seed layer on the substrate. A lower magnetic layer is plated on the substrate in an opening provided in an insulative layer which is deposited on the seed layer. A plurality of magnetic layers are plated at one end of the lower magnetic layer to build-up and form a first side pole by using the above seed layer as a seed. Another plurality of magnetic layers are plated at the other end of the lower magnetic layer to build-up and form a second side pole by using the same seed layer as a seed. The first and second side poles thus formed include upper and lower ends, the lower ends being plated to the ends of the lower magnetic layer. A first upper pole is plated to the upper end of the first side pole. The first upper pole includes a gap end facing the second side pole. A gap region of nonmagnetic material is deposited adjacent the gap end of the first upper pole. A second upper pole is plated to the upper end of the second side pole and includes a gap end adjacent the gap region. A diamond-like carbon (DLC) frame is fabricated at the uppermost portion of the head surrounding the upper side poles and gap region. The DLC frame provides both structural integrity to the head and wear protection when the head contacts the media surface.

19 Claims, 19 Drawing Sheets

U.S. PATENT DOCUMENTS

| | | |
|---|---|---|
| 4,942,490 | 7/1990 | Lehureau . |
| 4,949,207 | 8/1990 | Lazzari . |
| 4,953,050 | 8/1990 | Kumura et al. . |
| 4,970,615 | 11/1990 | Gau . |
| 4,984,118 | 1/1991 | Springer . |
| 4,992,897 | 2/1991 | Deroux-Dauphin . |
| 5,020,212 | 6/1991 | Michijima et al. . |
| 5,041,932 | 8/1991 | Hamilton . |
| 5,065,271 | 11/1991 | Matsuura et al. . |
| 5,073,242 | 12/1991 | Hamilton . |
| 5,090,111 | 2/1992 | Lazzari . |
| 5,111,351 | 5/1992 | Hamilton . |
| 5,122,917 | 6/1992 | Springer . |
| 5,155,646 | 10/1992 | Fujisawa et al. . |
| 5,163,218 | 11/1992 | Hamilton . |
| 5,166,845 | 11/1992 | Thompson et al. . |
| 5,168,408 | 12/1992 | Lazzari . |
| 5,175,658 | 12/1992 | Chang et al. . |
| 5,189,580 | 2/1993 | Pisharody et al. . |
| 5,195,006 | 3/1993 | Morikawa . |
| 5,196,976 | 3/1993 | Lazzari . |
| 5,198,948 | 3/1993 | Stover et al. . |
| 5,202,863 | 4/1993 | Miyatake et al. . |
| 5,208,716 | 5/1993 | Lazzari . |
| 5,216,559 | 6/1993 | Springer . |
| 5,224,260 | 7/1993 | Fedeli et al. . |
| 5,260,845 | 11/1993 | Takayama et al. . |
| 5,266,409 | 11/1993 | Schmidt et al. . |
| 5,271,802 | 12/1993 | Chang et al. . |
| 5,274,521 | 12/1993 | Miyauchi et al. . |
| 5,285,341 | 2/1994 | Suzuki et al. . |
| 5,316,617 | 5/1994 | Kawabe et al. ............................ 29/603 |
| 5,331,494 | 7/1994 | Fukuda et al. . |
| 5,384,195 | 1/1995 | Bachmann et al. . |
| 5,387,551 | 2/1995 | Mizoguchi et al. ........................ 438/3 |
| 5,391,510 | 2/1995 | Hsu et al. . |
| 5,406,434 | 4/1995 | Amin et al. . |
| 5,406,695 | 4/1995 | Amemori . |
| 5,408,373 | 4/1995 | Bajorek et al. . |
| 5,476,804 | 12/1995 | Lazzari ....................... 438/3 |
| 5,486,968 | 1/1996 | Lee et al. ................. 360/126 |
| 5,777,824 | 7/1998 | Gray ....................... 360/126 |
| 5,995,342 | 11/1999 | Cohen et al. ........................ 360/126 |

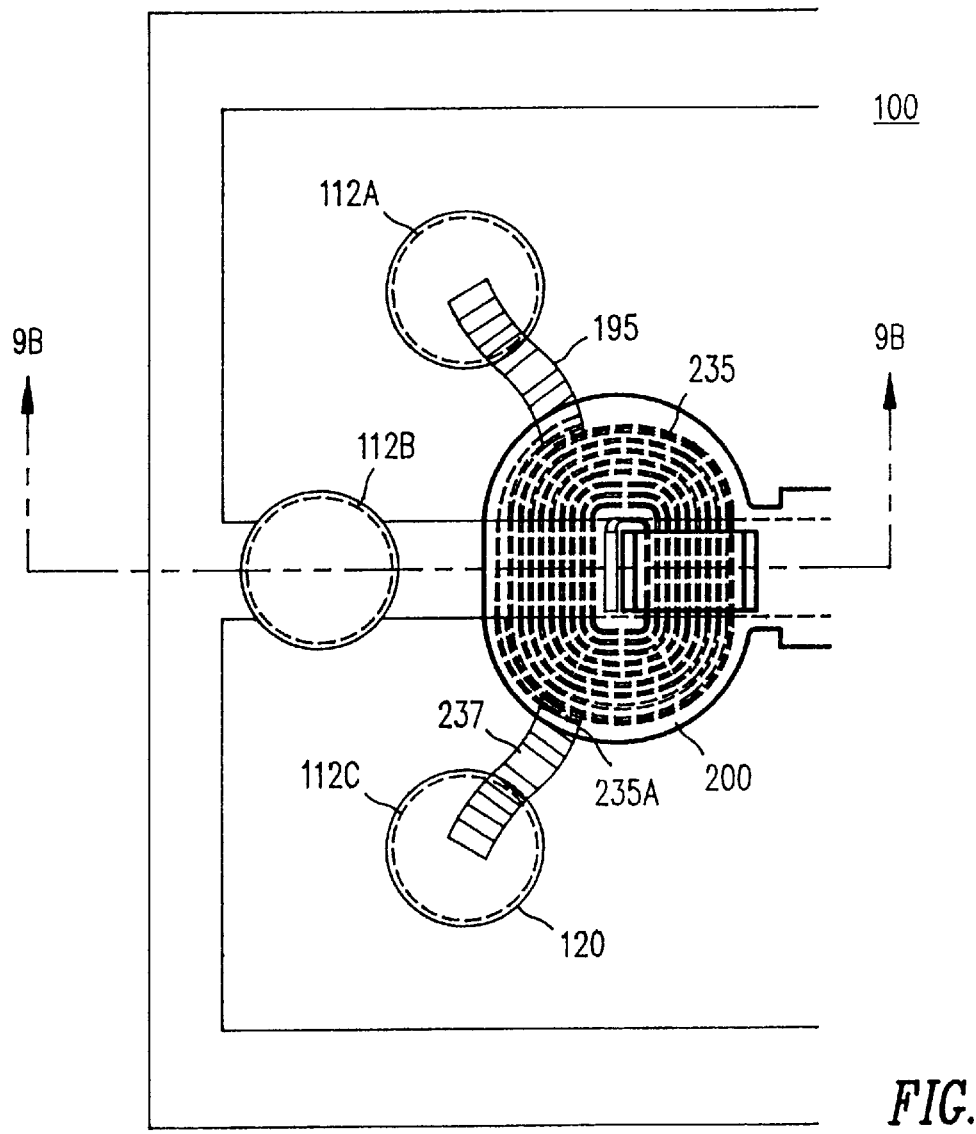
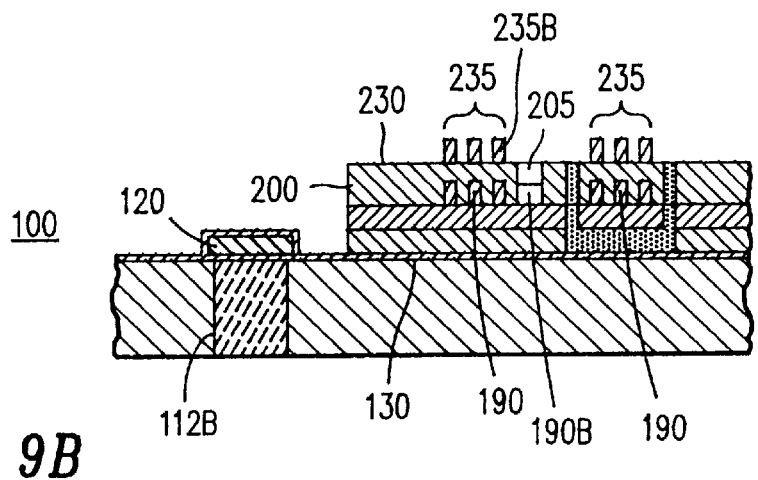
FIG. 9A
FIG. 9B

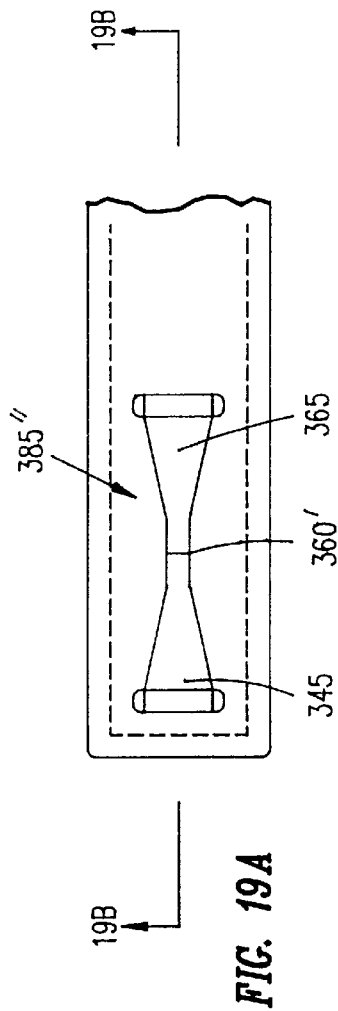
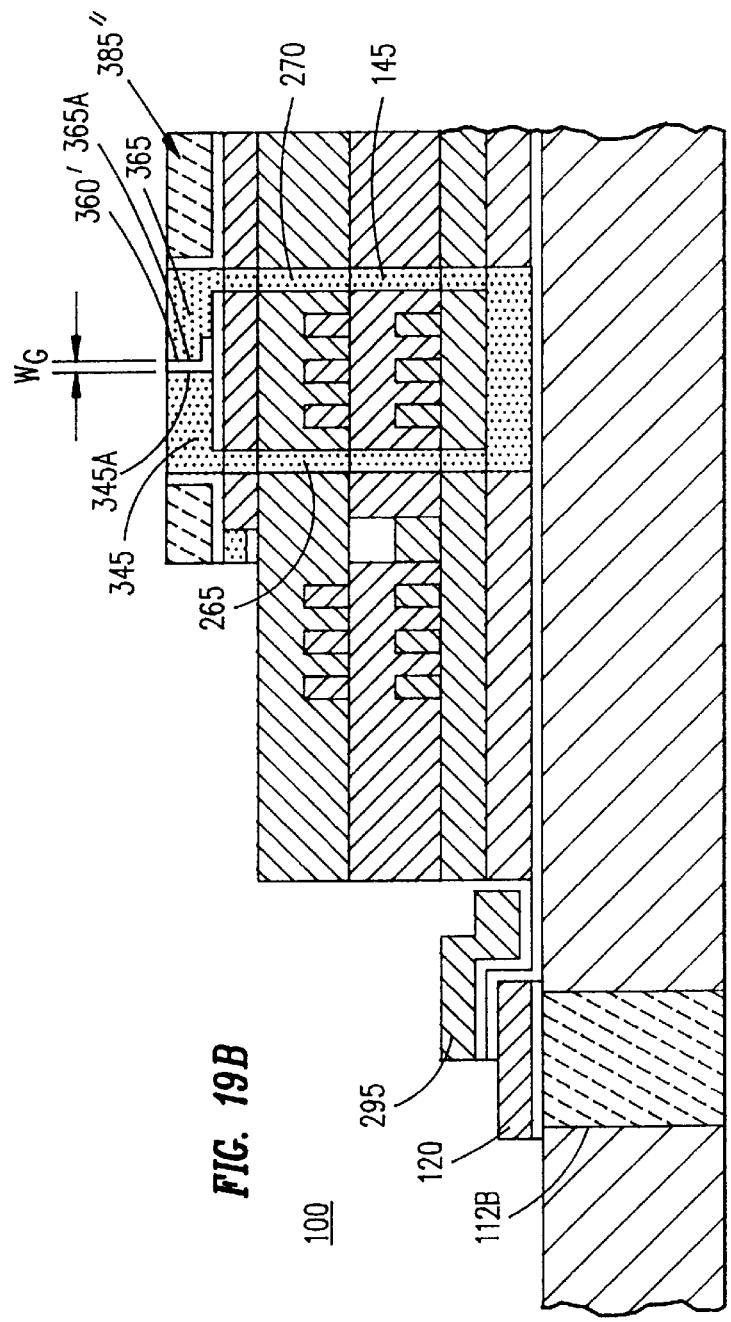
FIG. 19A
FIG. 19B

METHOD OF FABRICATING THIN FILM MAGNETIC HEAD INCLUDING DURABLE WEAR LAYER AND NON-MAGNETIC GAP STRUCTURE This Application is a Division of Ser. No. 08/650,587 filed May 20, 1996 now U.S. Pat. No. 5,801,909.

CROSS REFERENCE TO RELATED PATENT APPLICATIONS

This patent application is related to the copending patent application entitled "METHOD OF FABRICATING A THIN FILM MAGNETIC HEAD INCLUDING LAYERED MAGNETIC SIDE POLES", (Attorney Docket No. M-2773U.S.) by Malhotra et al., filed concurrently herewith and assigned to the same assignee, the disclosure of which is incorporated herein by reference.

BACKGROUND OF THE INVENTION

1. Field of the Invention

This invention relates in general to magnetic recording and playback heads and, more particularly, to thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer or substrate using semiconductor thin film processes. The sliders are then diced up into individual slider assemblies Unfortunately, thin film magnetic heads are subject to substantial wear when the head contacts magnetic recording media such as tape, for example. Over time, this wear can be very considerable and ultimately may be a cause for head failure if accumulated wear significantly damages the head.

SUMMARY OF THE INVENTION

One advantage of the thin film head of the present invention is significantly reduced head wear.

Another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

In accordance with one embodiment of the present invention, a thin film magnetic head is provided which includes a substrate and a lower pole member of magnetic material situated on the substrate and having first and second ends. The head includes first and second side pole members of magnetic material situated at the first and second ends, respectively, of the lower pole member. The first and second side pole members are built up from a plurality of layers of magnetic material deposited layer upon layer. The first and second side pole members include tops and bottoms. The head also includes a conductor coil situated around one of the first and second side pole members and separated from the first and second side pole members by insulative layers. The head further includes an insulative pedestal situated at the tops of the first and second side pole members, the insulative pedestal extending above the plane of the insulative layers below and surrounding the tops of the first and second side pole members. The head includes first and second magnetic poles situated atop the pedestal, the first magnetic pole extending from the first side pole toward the second side pole, the second magnetic pole extending from the second side pole toward the first magnetic pole. A gap region is formed between the first and second magnetic poles and is filled with nonmagnetic material. The head further includes a diamond-like carbon (DLC) frame situated atop the pedestal and surrounding the first and second magnetic poles. The DLC frame provides both structural integrity to the head and wear protection therefor.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 9A is a plan view of the magnetic head of FIG. 8A showing placement of an upper coil structure.

FIG. 9B is a cross sectional view of the magnetic head of FIG. 8A taken along section line 9B—9B.

FIG. 19A is a close-up view of the side pole and gap region of the magnetic head when fabrication is complete.

FIG. 19B is a cross section view of the magnetic head of FIG. 19A taken along section line 19B—19B.

DETAILED DESCRIPTION OF THE INVENTION

Figure 2A:
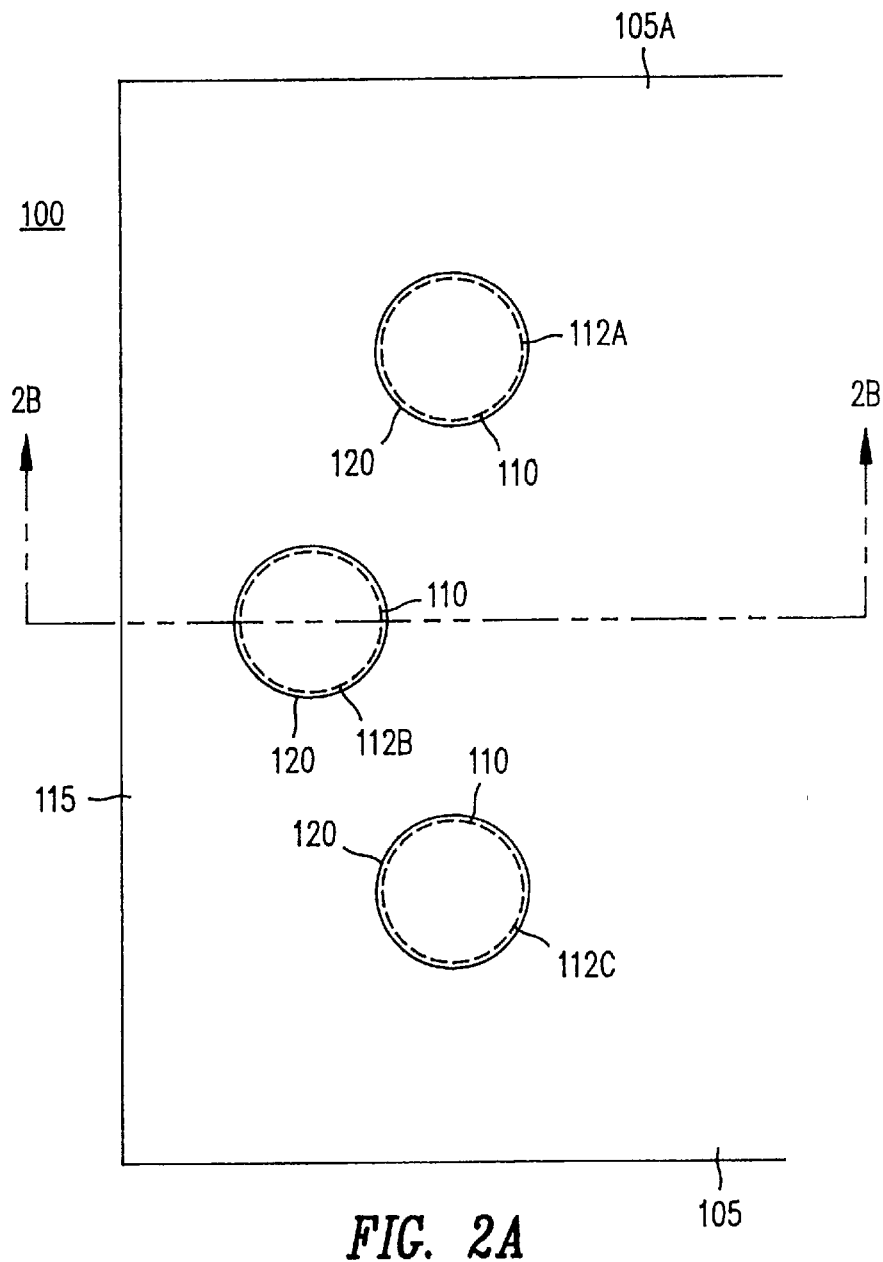
FIG. 2A is a plan view of a substrate with via holes employed by one embodiment of the magnetic head of the invention.

FIG. 2A shows a portion of a thin film head 100 which is situated on an insulative substrate 105 such as a ceramic, alumina or other nonconductive substrate. Substrate 105 includes opposed surfaces 105A and 105B. Via holes 110 are formed in substrate 105 and are filled with an electrically conductive material to create conductive paths through substrate 105 at the locations shown. Laser drilling or other high precision via formation technique may be employed to form via holes 110. Via holes 110 are filled with electrically conductive material such as plated copper, thick film processed gold, or sintered tungsten and copper, for example, to form via connective members 112A, 112B and 112C. Connective members 112A and 112C will subsequently be coupled to the ends of a coil structure and connective member 112B will be coupled to ground. In one embodiment of the invention wherein the magnetic head is ungrounded, via hole 112B is omitted. In actual practice, substrate 105 is a wafer on which the FIG. 2A pattern is replicated thousands of times.

Figure 2B:
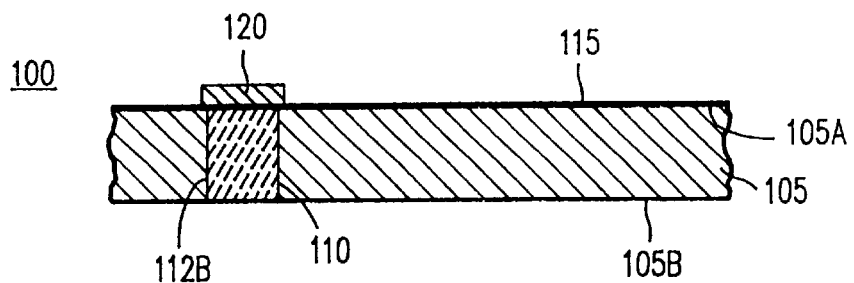
FIG. 2B is a cross section of the magnetic head of FIG. 2A taken along section line 2B—2B.

A seed layer 115 of an electrically conductive material suitable for plating is sputtered on substrate surface 105A. For example, seed layer 115 may be fabricated from Cr—NiV, namely, a chrome or other adhesion-promoting layer followed by a non-magnetic nickel-vanadium 7% film. Via caps 120 are patterned using photolithographic techniques and plated on seed layer 115 at the tops of vias 110 as shown in FIGS. 2A and 2B. More specifically, to pattern via caps 120, a photoresist layer (not shown) is deposited on seed layer 115 and patterned to include openings above connective members 112A, 112B and 112C at which the formation of respective via caps 120 is desired. Plating is then conducted in these openings using seed layer 115 as the seed. The photoresist is then removed, thus leaving patterned via caps 120. As used in this document, the term "patterning" will mean the formation of a particular layer such that the layer exhibits a specified pattern, such as described with respect to the formation of via caps 120 above, for example.

Via caps 120 are fabricated from NiFe by any suitable deposition or plating process. It is noted that later in the process described herein, portions of seed layer 115 will be removed by sputter etching. While in the particular example described, via caps 120 are fabricated from NiFe, in actual practice via caps 120 can be fabricated from other conductive materials which would not be attacked by the particular etchant used to later remove Cr—Cu seed layers 185, 230 and 275. Via caps 120 are regarded as being a part of via connective members 112A, 112B and 112C.

Seed layer 115 is also used to pattern and NiFe plate photolithographic alignment targets (not shown) for registration of subsequent layers. The exposed portions of seed layer 115 are then sputter etched away leaving via caps 120 and the alignment targets intact. It should be appreciated that seed layer 115 served as a sacrificial layer for the purpose of enabling plating of via caps 120.

Figure 1:
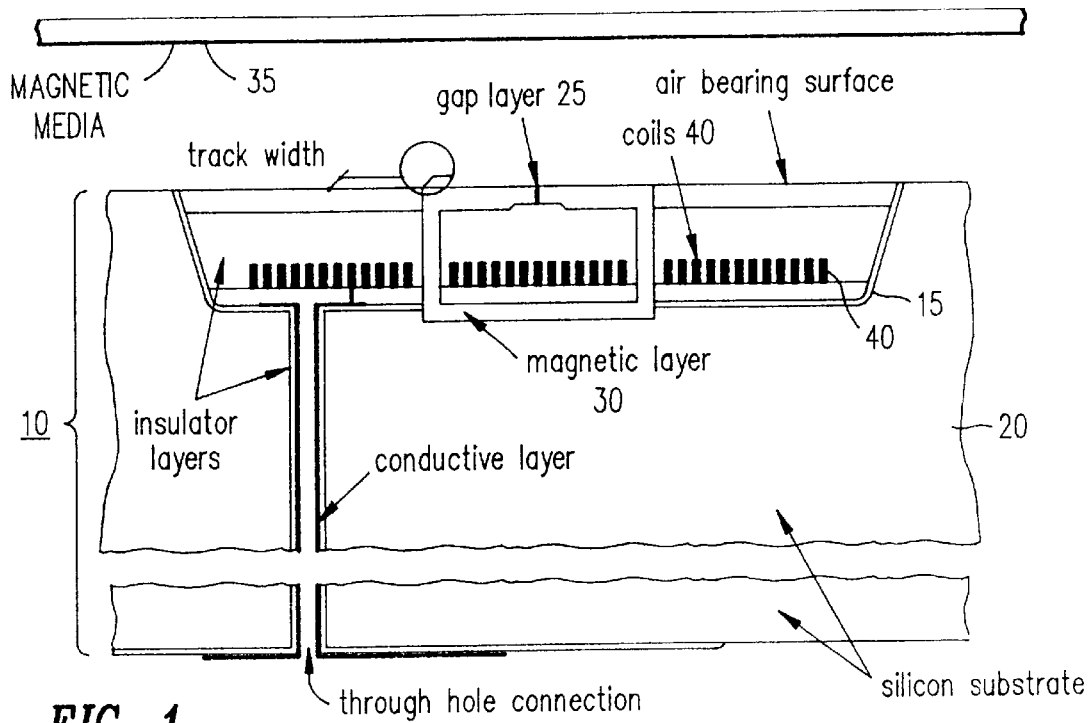
FIG. 1 is a cross section of a conventional thin film magnetic head.
Figure 3:
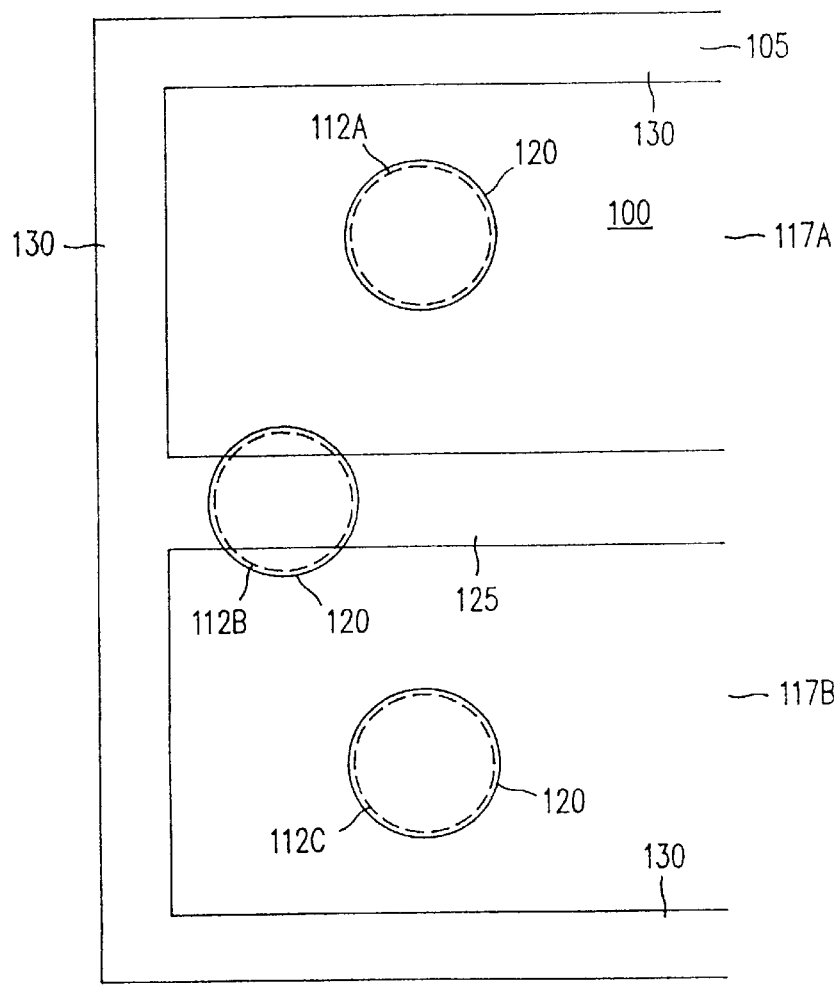
FIG. 3 is a plan view of the magnetic head of FIG. 2A with a seed layer added.

In the next step of the process, a Cr—NiV seed layer 130 is formed on the structure of FIG. 2B after seed layer 115 is etched away. Seed layer 130 is formed in the shape of a ground structure 125 which extends around the periphery of head 100 on substrate 105 and laterally across the middle of head 100 as shown in FIG. 3. Open regions 117A and 117B are thus formed in seed layer 130 which respectively isolate via connective members 112A and 112C from ground structure 125 and via connective member 112B. In the embodiment depicted in FIG. 3, via connective member 112B is coupled to ground structure 125. To actually form seed layer 130, a "lift-off" process is used. In this "lift-off" process, photoresist (not shown) is patterned covering open regions 117A and 117B (see FIG. 3). Seed layer 130 is then sputtered on the entire upper surface of the partially completed head 100. The photo-resist which covers open regions 117A and 117B is now "lifted-off" head 100. To accomplish this lift-off, the partially complete head 100 is placed in an ultrasonic bath including a photoresist solvent such as acetone, for example. The seed layer 130 is sufficiently thin such that it does not cover photoresist layer at open regions 117A and 117B very well. In this manner, there are sufficient avenues of attack by which the solvent can get through seed layer 130 at the edges of open regions 117A and 117B to dissolve the photoresist layer at open regions 117A and 117B. When the photoresist layer at open regions 117A and 117B is thus dissolved, the portions of seed layer 130 immediately above open regions 117A and 117B lift-off and float away. The region of head 100 at open regions 117A and 117B is thus void of seed layer 130 as shown in FIG. 4C.

Figure 4A:
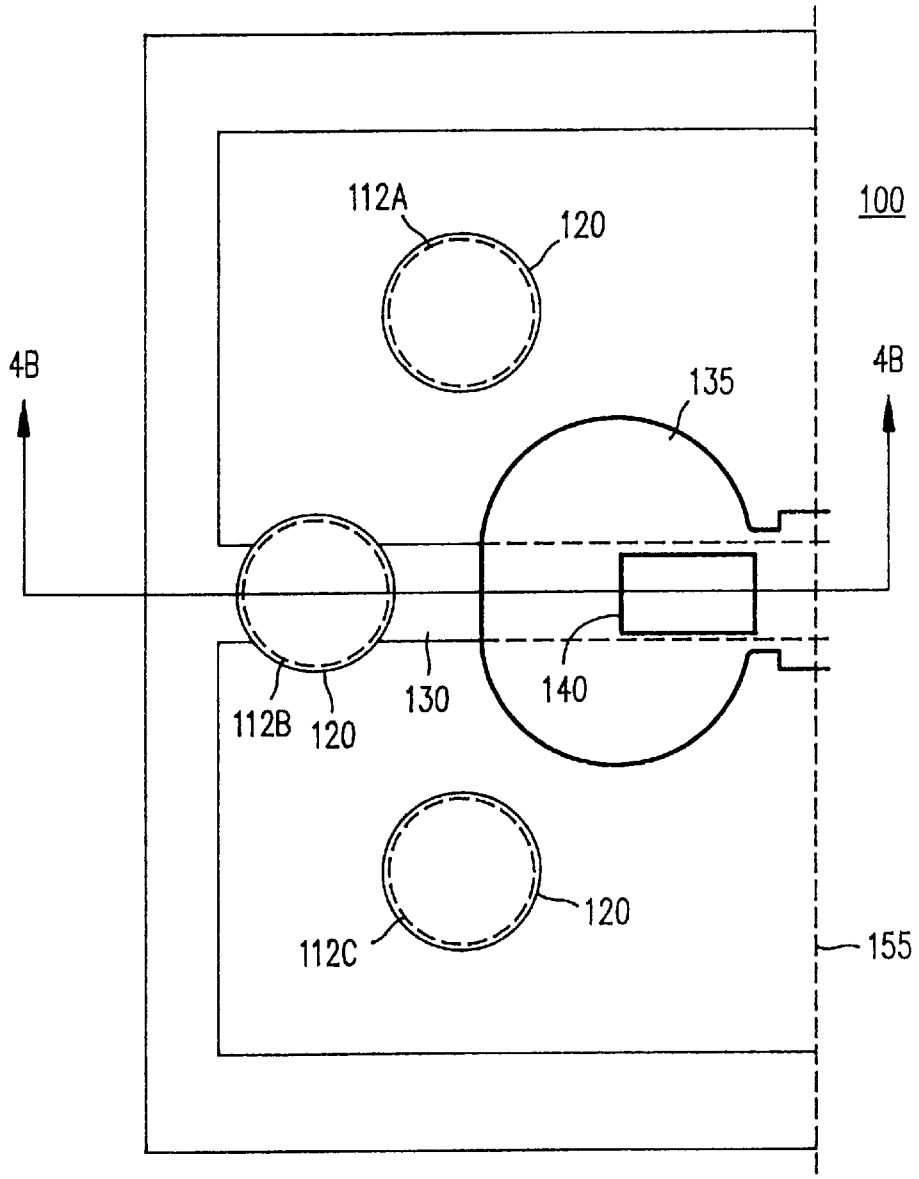
FIG. 4A is a plan view of the magnetic head of FIG. 3 with an insulative layer and open region formed therein.
Figure 4B:
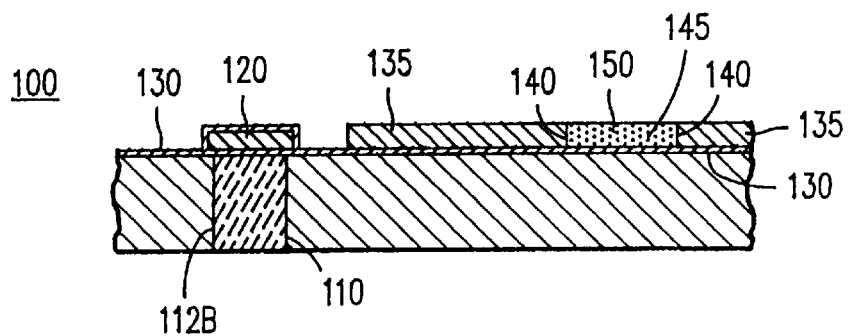
FIG. 4B is a cross sectional view of the magnetic head of FIG. 4A taken along section line 4B—4B.

An insulative layer 135 of photoresist is patterned on head 100 as shown in FIG. 4B. Insulative layer 135 is cured with an electron beam. Exposing the photoresist to an E-beam for a time within the range of approximately 20 minutes to approximately 40 minutes is found to produce acceptable curing results. Insulative layer 135 includes an open region 140 for receiving the lowermost portion of a magnetic yoke 145 therein. More particularly, a layer 150 of magnetic material such as NiFe is patterned and plated on seed layer 130 within open region 140 to form the lowermost portion of magnetic yoke 145. Magnetic layer 150 exhibits a thickness of approximately 5 microns to approximately 6 microns in this particular embodiment. When reference is made to "magnetic layers" or other magnetic structures in this document, it should be understood that layers of magnetically permeable material are being referenced. Magnetic layer 150 forms the bottom pole of magnetic yoke 145. Seed layer 130, or more specifically the middle section of the ground structure 125 thereof, acts as a base upon which magnetic yoke 145 is built up layer by layer. Magnetic layer 150 is plated up to a level such that it is level with insulative layer 135.

Figure 5:
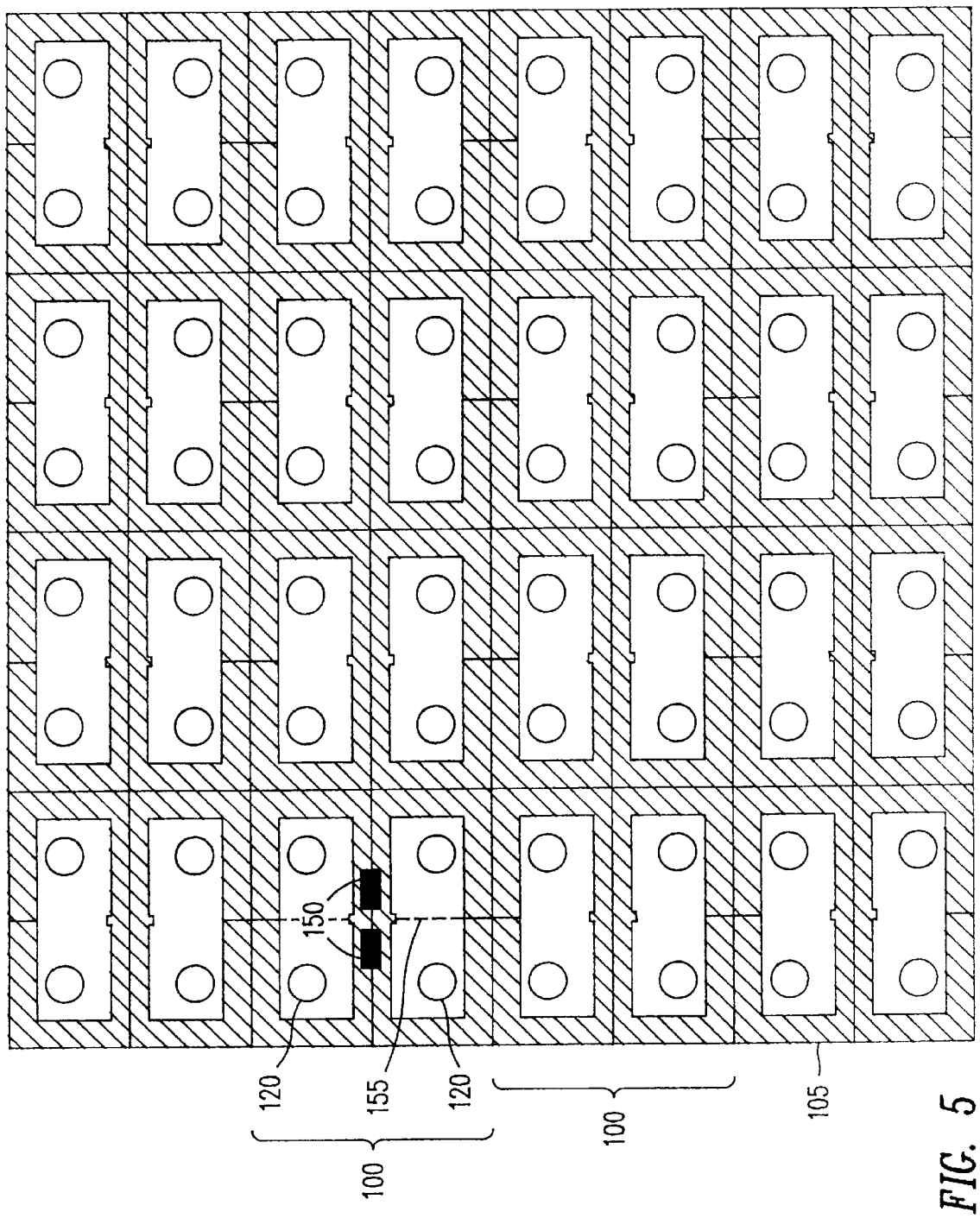
FIG. 5 illustrates a plurality of magnetic heads being fabricated on a common substrate.

For convenience, one half of head 100 is depicted in FIG. 4A and subsequent figures. It should be understood that substantially the same structure as shown in FIG. 4A and the subsequent figures is repeated to form the actual head. More particularly, in the particular embodiment shown, head 100 is symmetric about major axis 155 such that head 100 actually includes two recording or playback portions. In actual practice, a plurality of heads 100 are fabricated simultaneously on a common semiconductor substrate 105 as shown in FIG. 5. For example, 5000 or more heads may be fabricated at the same time on the same substrate. FIG. 5 shows another embodiment of head 100, namely an ungrounded version in which via connective member 112B is omitted.

Figure 6A:
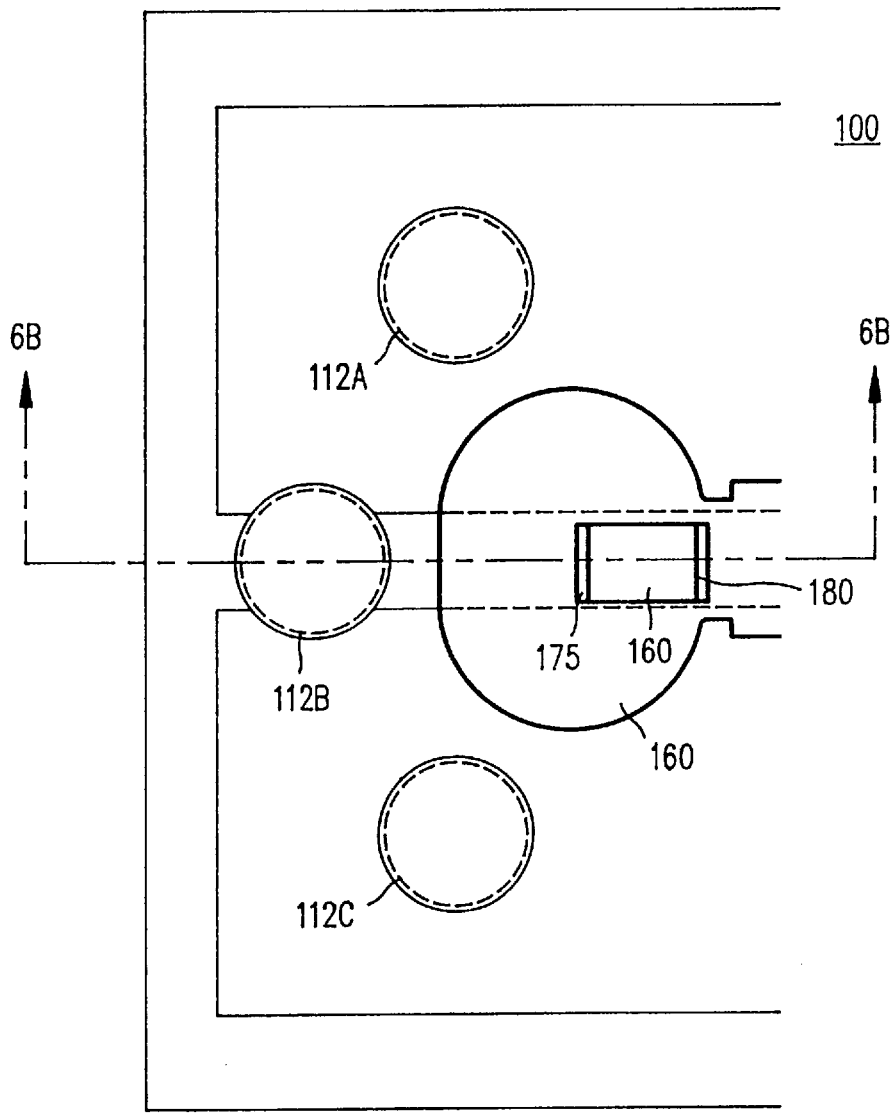
FIG. 6A is a plan view of the magnetic head of FIG. 4A showing an early stage of side pole build-up
Figure 6B:
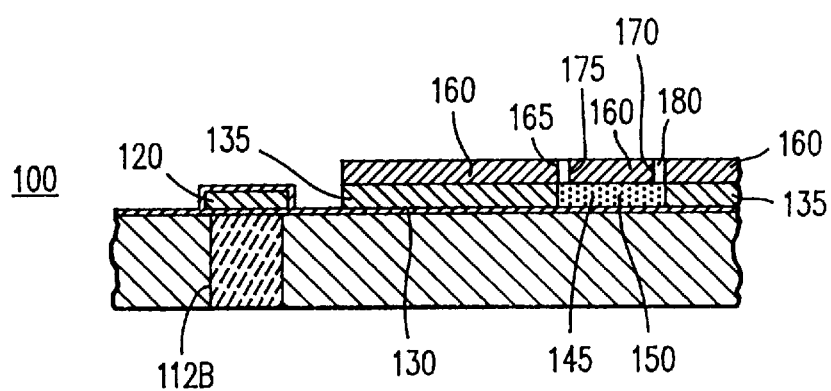
FIG. 6B is a cross sectional view of the magnetic head of FIG. 6A taken along section line 6B—6B.

An insulative layer 160 of photoresist is patterned on head 100 as shown in FIG. 6A and 6B. Insulative layer 160 is electron beam cured to provide a planar surface as illustrated. The thickness of insulative layer 160 in this particular embodiment is approximately 2 microns. Insulative layer 160 includes open regions 165 and 170 in which respective magnetic side poles are built up. More specifically, a magnetic side pole portion 175 is plated in open region 165 up to a height which is level with insulative layer 160, and a magnetic side pole portion 180 is plated in open region 170 up to a height which is level with insulative layer 160.

Figure 7A:
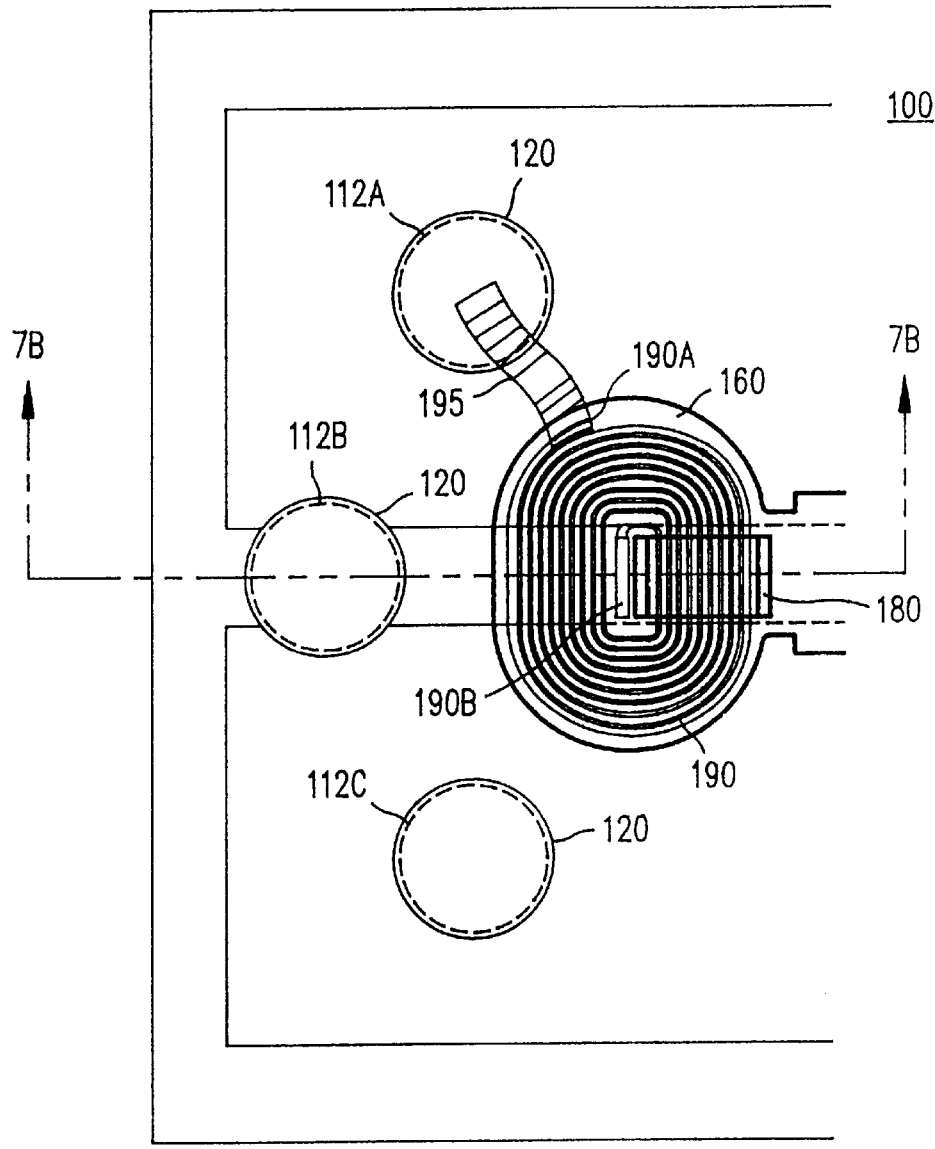
FIG. 7A is a plan view of the magnetic head of FIG. 6A showing the placement of a lower coil structure.
Figure 7B:
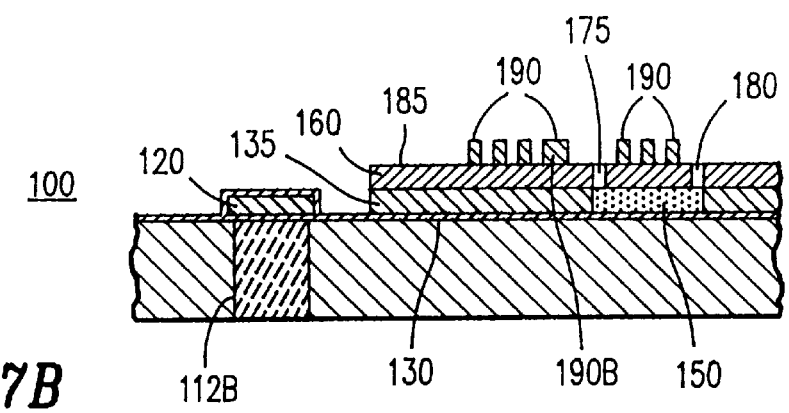
FIG. 7B is a cross sectional view of the magnetic head of FIG. 7A taken along section line 7B—7B.

A seed layer 185 is sputtered on insulative layer 160 of the partially formed head 100 of FIG. 6A to form a plating base for a lower coil layer 190 as shown in FIG. 7A. Seed layer 185 is drawn sufficiently thin such that it does not appear to have significant vertical dimension in FIG. 7A. Seed layer 185 is fabricated from CrCu in one embodiment.

A lower coil layer 190 is formed on seed layer 185 as shown. One way to form lower coil member 190 is to deposit a layer of photoresist (not shown) on seed layer 185. This photoresist layer is then patterned using conventional photolithographic techniques which includes photoresist application, masking, exposure, developing, and so forth. More specifically, the photoresist layer is patterned to cover the entire surface of seed layer 185 except for openings at the locations where the coil elements of lower coil layer 190 are to be formed. Head 100 is then subjected to a plating bath of copper. copper is thus plated in the openings of the photoresist layer to form lower coil layer 190. The thickness of coil layer 190 is within the range of approximately 3 $\mu$ to approximately 3.5 $\mu$ at this stage.

Lower coil layer 190 includes a connective strip 195 made of electrically conductive material which couples an end 190A of coil layer 190 to the via cap 120 of via connective member 112A. Copper plating may be used to fabricate connective strip 195 as part of the above step of forming loser coil layer 190. The remaining end 190B of lower coil layer 190 is located at the center of the lower coil. Head 100 is then etched to remove seed layer 185 from those portions of head 100 not protected by lower coil layer 190.

Figure 8A:
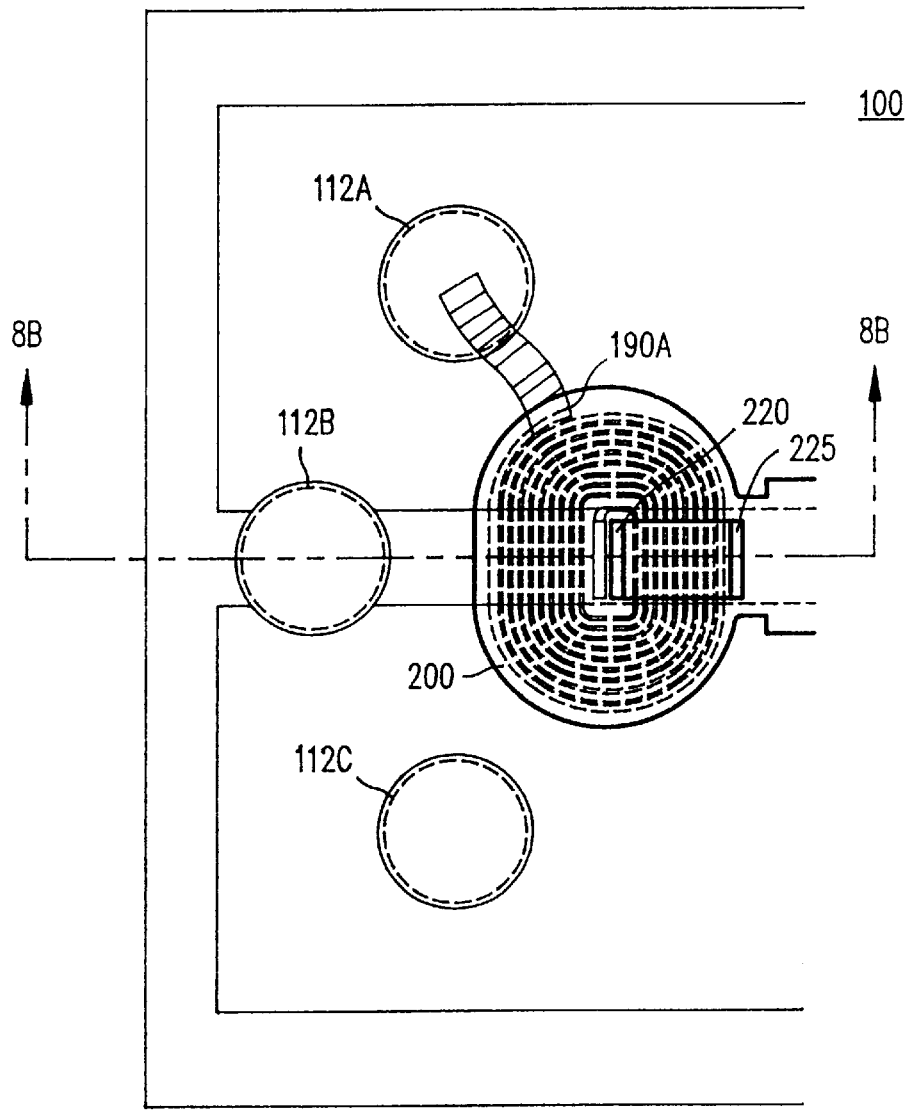
FIG. 8A is a plan view of the magnetic head of FIG. 7A showing an insulative layer on the lower coil structure.
Figure 8B:
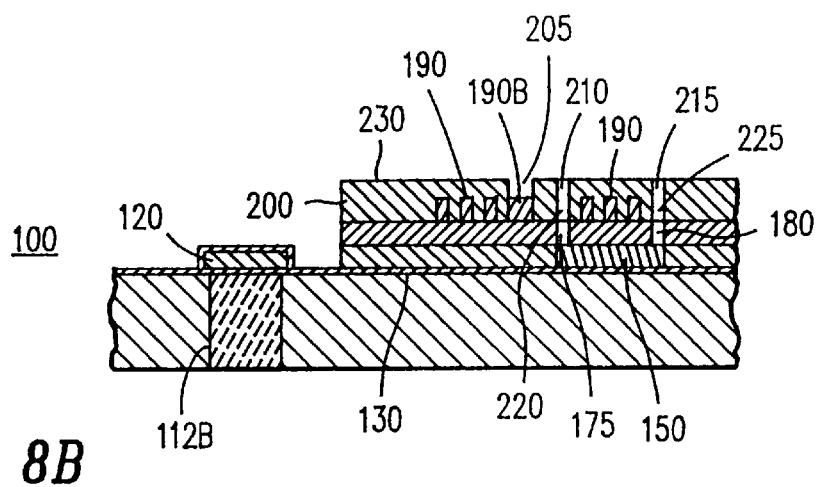
FIG. 8B is a cross sectional view of the magnetic head of FIG. 8A taken along section line 8B—8B.

An insulative layer 200 of photoresist is patterned on head 100 above lower coil layer 190 leaving an open region 205 for access to coil end 190B as shown in FIGS. 8A and 8B. The thickness of insulative layer 200 is within the range of approximately 5 $\mu$ to approximately 6 $\mu$. Insulative layer 200 is also patterned to leave open regions 210 and 215 above side pole portion 175 and side pole portion 180, respectively. Insulative layer 200 is electron beam cured. Insulative layer 200 electrically isolates lower coil layer 190 from structures subsequently placed above layer 190.

Magnetic side pole portions 220 and 225 are plated on side pole portions 175 and 180, respectively, as shown in FIGS. 8A and 8B. Side pole portions 220 and 225 are plated with a magnetic material such as NiFe up to a level even with that of insulative layer 200.

A seed layer 230 is sputtered on insulative layer 200 of the partially formed head 100 of FIG. 8B to form a plating base for an upper coil layer 235. Seed layer 230 is drawn sufficiently thin such that it does not appear to have significant vertical dimension in FIG. 8B. Seed layer 230 is fabricated from CrCu in one embodiment. Upper coil layer 235 is patterned and copper plated on seed layer 230 as shown in FIG. 9A and 9B. FIG. 9B is a simplified cross-section of head 100 at the described stage of fabrication in which structures in back of upper coil layer 235 are not shown in order to emphasize upper coil layer 235. In this particular embodiment, upper coil layer 235 is substantially similar in geometry to lower coil layer 190 and is fabricated using substantially the same technique. However, other coil arrangements are possible if desired. Head 100 is then etched to remove seed layer 230 from those portions of head 100 not protected by upper coil layer 235.

Upper coil layer 235 includes a connective strip 237 made of electrically conductive material which couples an end 235A of upper coil layer 235 to the via cap 120 of via connective member 112C. Copper may be used to fabricate connective strip 237. The remaining end 235B of upper coil layer 235 is coupled to lower coil end 190B through open region 205, shown later in FIG. 10B, by a plated connection therebetween.

Figure 10A:
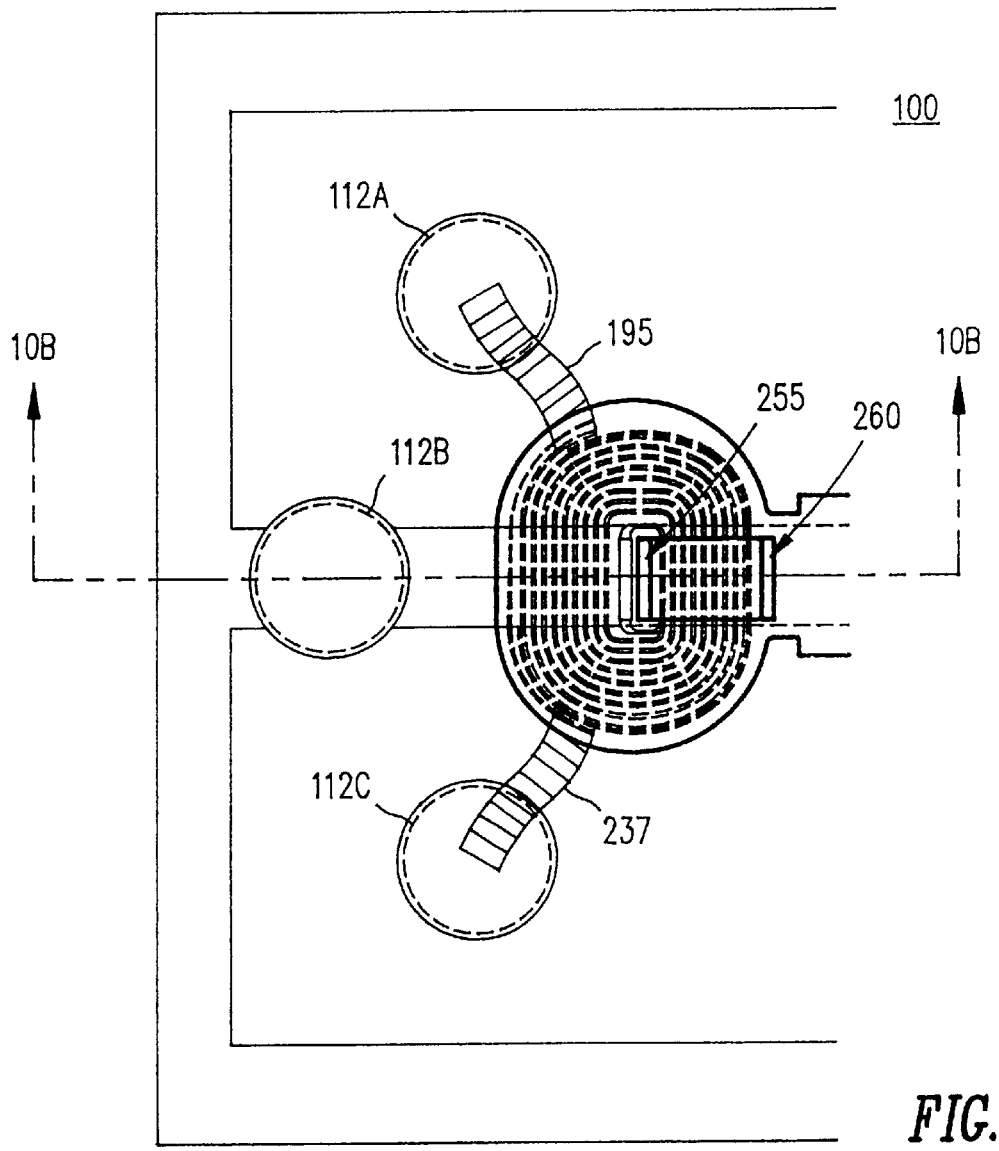
FIG. 10A is a plan view of the magnetic head of FIG. 9A showing an insulative layer on the upper coil structure.
Figure 10B:
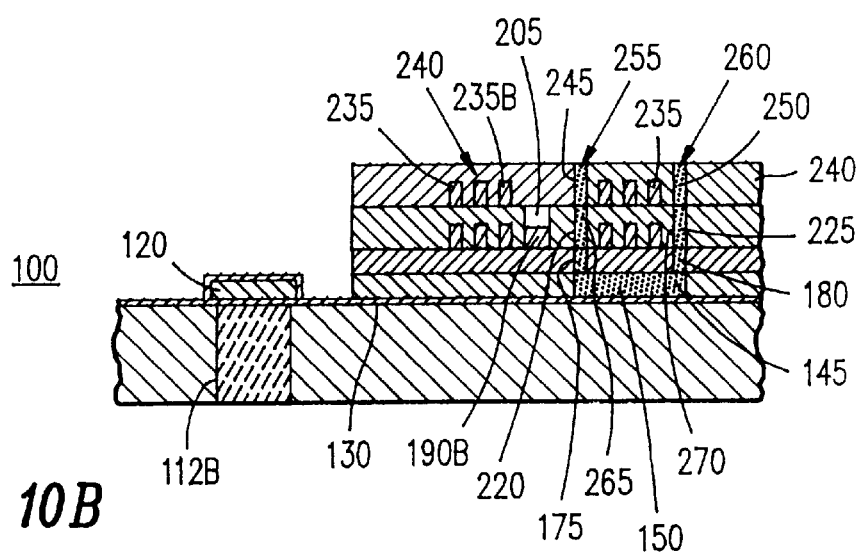
FIG. 10B is a cross sectional view of the magnetic head of FIG. 10A taken along section line 10B—10B.

An insulative layer 240 of photoresist material is deposited and patterned on head 100 as shown in FIGS. 10A and 10B. Insulative layer 240 electrically isolates upper coil layer 235 from the other structures of head 100. Insulative layer 240 includes open regions 245 and 250 into which magnetic side pole portions 255 and 260 are respectively plated. More specifically, magnetic side pole portions 255 and 260 are plated up to a level even with insulative layer 240 as shown in FIG. 10B.

Magnetic side pole portions 175, 220 and 255 together form a first side pole 265. Magnetic side pole portions 180, 225 and 260 together form a second side pole 270. First side pole 265, second side pole 270 and bottom pole 150 together form a significant portion of magnetic yoke 145.

Figure 11A:
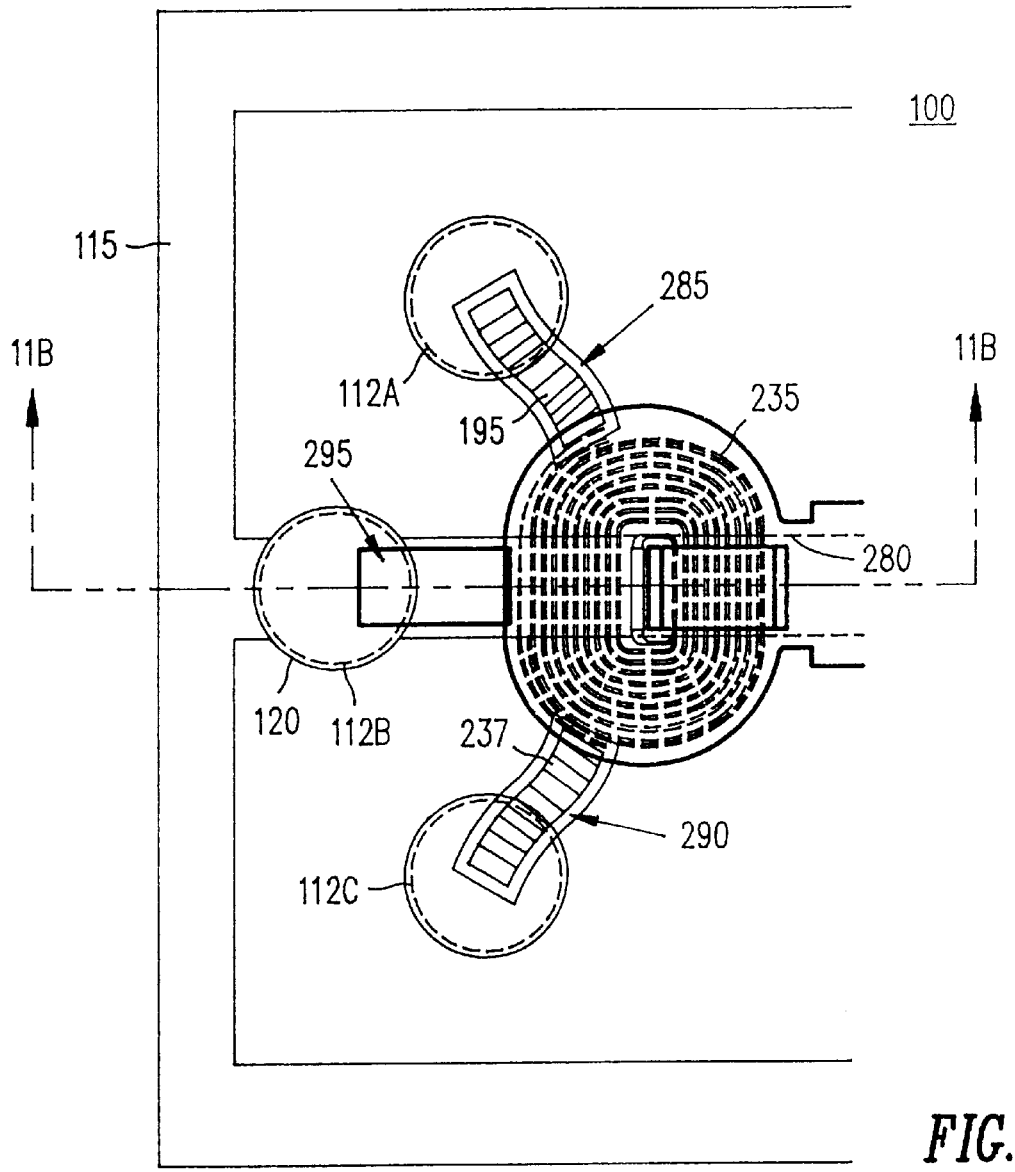
FIG. 11A is a plan view of the magnetic head of FIG. 10A showing placement of a seed layer and a connective grounding strip.
Figure 11B:
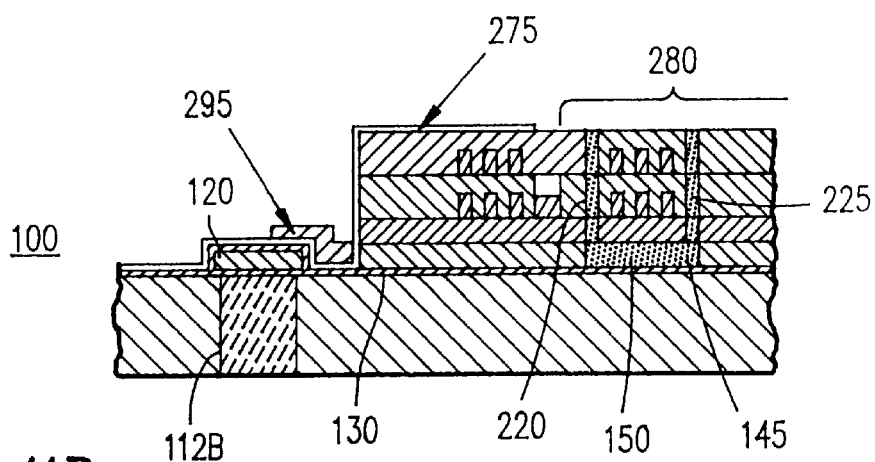
FIG. 11B is a cross sectional view of the magnetic head of FIG. 11A taken along section line 11B—11B.

A seed layer 275 fabricated of CrCu material is formed on the upper surface of the head structure 100 as shown in FIG. 11B. Seed layer 275 is sputtered, patterned and chemically etched on the upper surface of head 100 to include an open region 280 above the side pole structure also as shown in FIG. 11B. Seed layer 275 is formed by an adhesion layer of chromium (Cr) on the upper surface of head 100 followed by a layer of copper (Cu). The chromium adhesion layer enhances the adherence of the copper portion of seed layer 275 to upper surface of head 100.

The primary requirement in selection of the material for seed layer 275 is that seed layer 275 be chemically etchable without damage to the exposed NiFe. Copper is an example of a material that meets this requirement and is also used for the coil seed layers. Chrome is used as the adhesion layer for copper. It is noted that a titanium-tungsten seed layer (Ti 10%; W 90%) which wet etches easily can also be used for seed layer 275.

Protective caps 285 and 290 are patterned over connective strips 195 and 237, respectively. Caps 285 and 290 are fabricated from NiFe by plating in one embodiment. A material such as nickel, nickel-phosphorus 7–10%, or gold may be used to provide environmental protection for the underlying plated copper connective strips.

In an embodiment of head 100 wherein head 100 is grounded, a grounding connective strip 295 is also patterned and plated in the same process step as protective caps 285 and 290. Grounding strip 295 connects ground via connective member 112B and magnetic yoke 145 through seed layer 130. Grounding strip 295 is fabricated from the same material as protective caps 285 and 290 in this particular embodiment.

Figure 12:
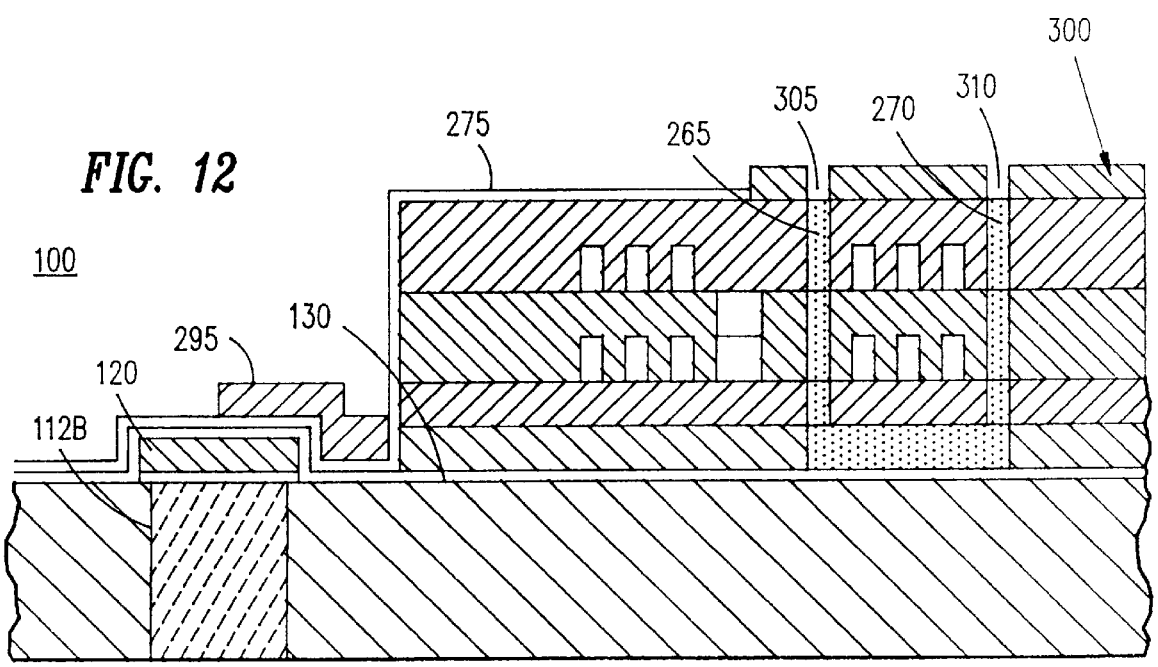
FIG. 12 is a cross sectional view of the magnetic head of FIG. 11B showing placement of an insulative pedestal thereon.
Figure 13B:
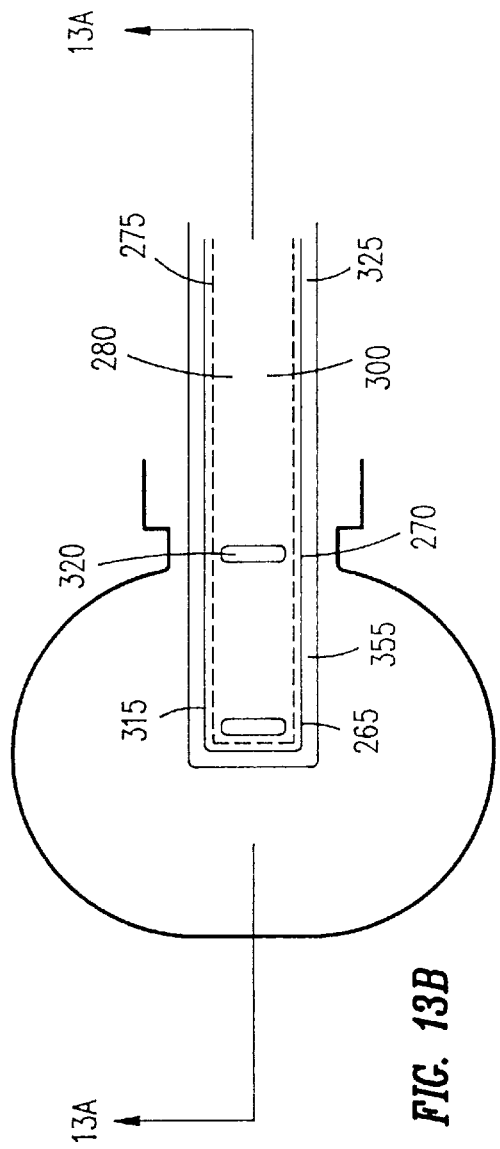
FIG. 13B is a close-up plan view of a portion of the head of FIG. 13A showing the side pole and insulative pedestal area.
Figure 13A:
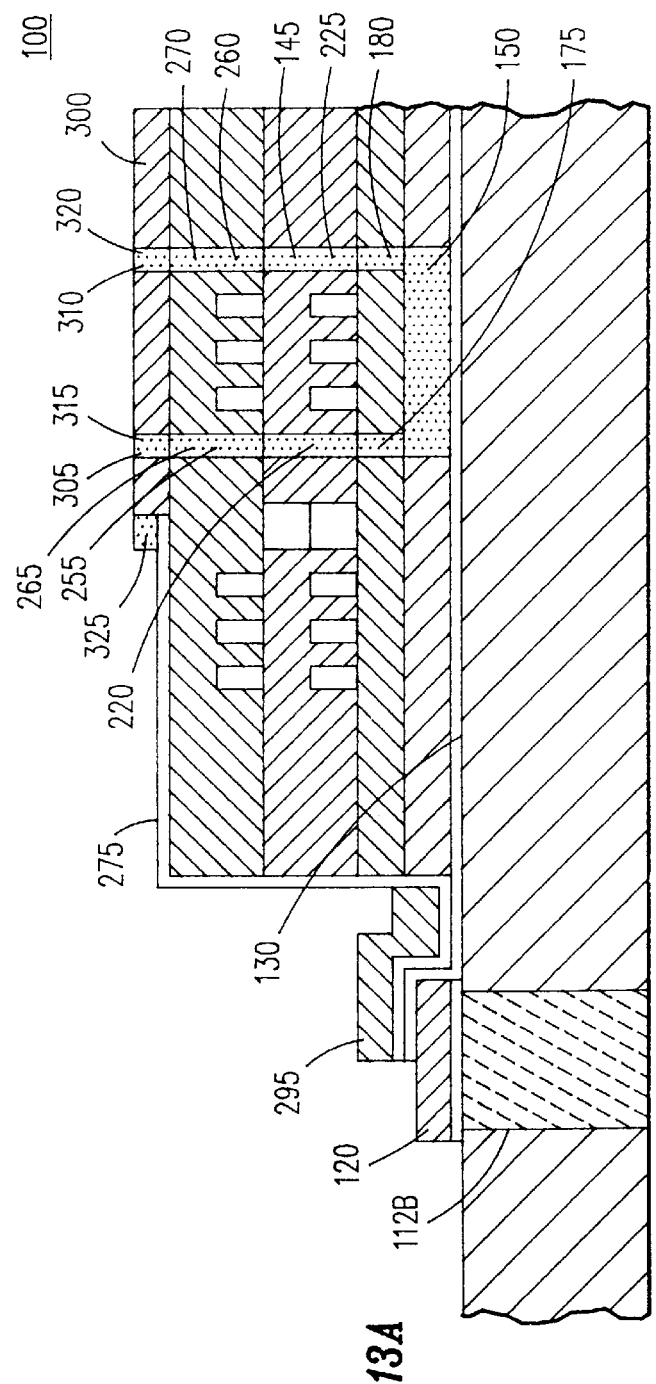
FIG. 13A is a cross sectional view of the magnetic head of FIG. 13B showing the further build-up of the magnetic side poles.

An electrically insulative layer of photoresist is patterned and electron beam cured to form a protrusion or pedestal 300 on the upper portion of head 100 as shown in FIG. 12. Insulative pedestal 300 exhibits a substantially rectangular geometry with rounded corners in this particular embodiment, although other geometries may be used if desired. Insulative pedestal 300 includes open regions 305 and 310 for side poles 265 and 270 of the magnetic yoke. Open regions 305 and 310 are filled with magnetic material by plating side poles 265 and 270 with NiFe up to the level of the top of insulative layer 300 as shown in FIG. 13A. Magnetic side pole portions 315 and 320 are thus formed in open regions 305 and 310. Magnetic side pole portions 315 and 320 form the uppermost parts of first side pole 265 and second side pole 270, respectively.

A frame 325 of magnetic material, for example NiFe, is patterned around insulative pedestal 300 at the same time that magnetic side pole portions 315 and 320 are plated. Plating or other suitable deposition technique is used to form frame 325. Frame 325 exhibits a thickness of approximately 5 $\mu$ in this particular embodiment. Seed layer 275 acts as the seed for the plating of frame 325. Frame 325 exhibits a substantially rectangular shape in this particular embodiment and surrounds insulative pedestal 300 which forms the inner boundary of frame 325 as seen in FIG. 13B. Shapes other than rectangular can be used for frame 235 as long as frame 325 substantially surrounds, and is located immediately adjacent to, pedestal 300. Frame 325 serves to stiffen insulative pedestal 300 and may provide electrical shielding of the contained structures. FIG. 13B is a close-up view of the coil and side pole regions of head 100 at the present stage in the fabrication of head 100. Alternatively, side pole portions 315 and 320 are fabricated as before, but frame 325 is subsequently patterned and plated with non-magnetic NiP alloy up to a level even with the top of insulative pedestal 300. The innermost boundary of seed layer 275 which abuts its open region 280 is shown in dashed line in FIG. 13B. The exposed CrCu seed layer 275 is removed by wet chemical etching.

Figure 14C:
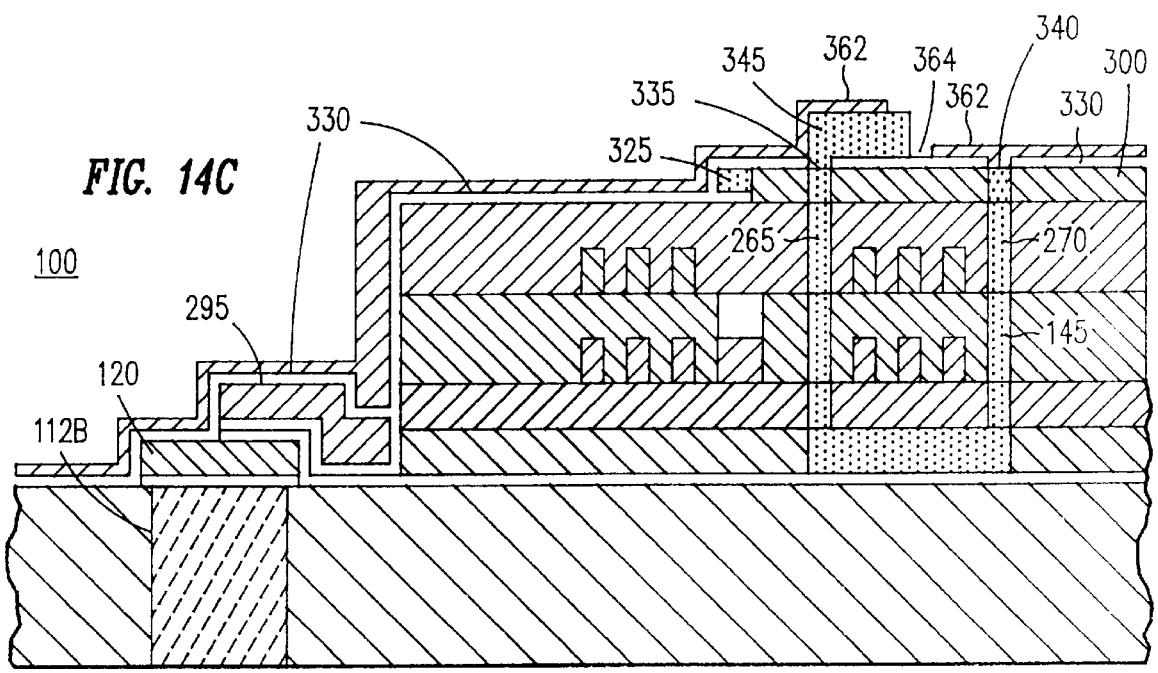
FIG. 14C is a cross-sectional view of the head showing a photoresist layer with an open region in which gap material is to be deposited.
Figure 14B:
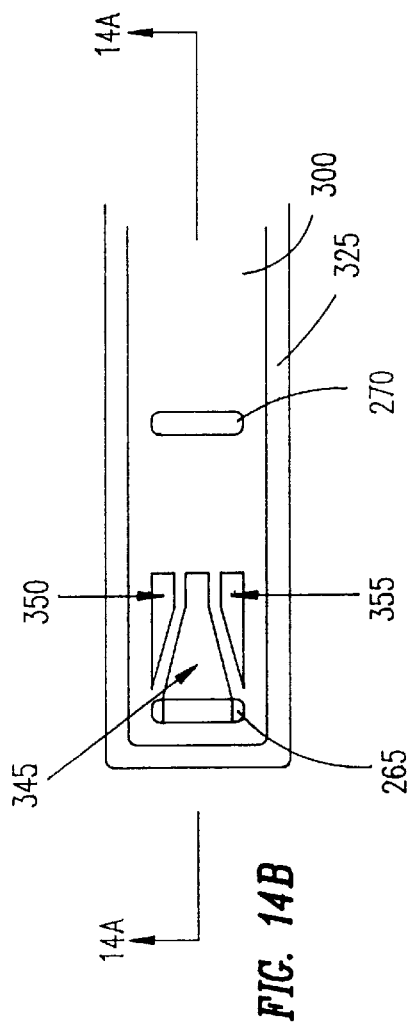
FIG. 14B is a close-up plan view of a portion of the head of FIG. 14A showing the first magnetic pole.
Figure 14A:
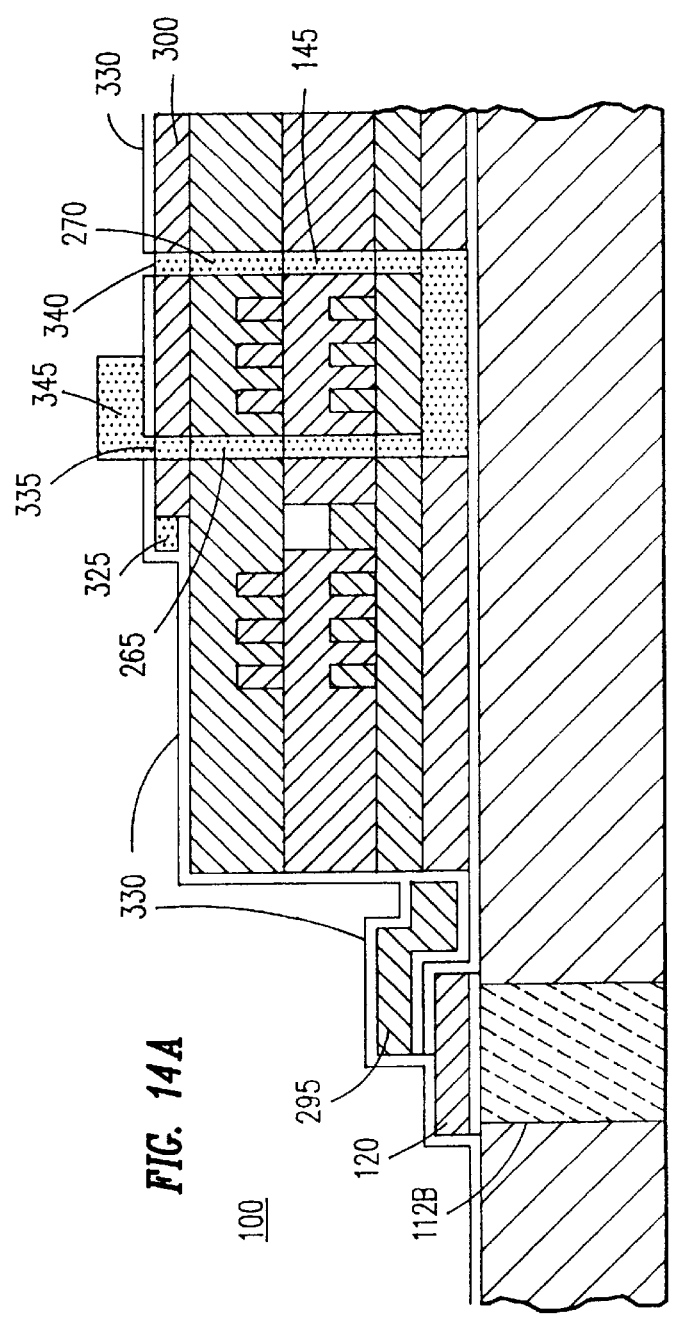
FIG. 14A is a cross sectional view of the magnetic head of FIG. 14B showing the addition of a first magnetic pole at the top of the magnetic yoke structure of the head.

Referring now to FIGS. 3, 14A and 14B, a layer of photoresist is patterned covering open regions 117A and 117B (see FIG. 3) and further covering side poles 265 and 270 (see FIGS. 14A and 14B). A Cr—NiV seed layer 330 is sputtered on the exposed upper surfaces of head 100. The photo-resist is stripped as in the earlier-described "lift-off" process, thus "lifting off" the sputtered Cr—NiV film from regions 117A and 117B. During this photoresist stripping step, the photoresist above side poles 265 and 270 is removed to form open regions 335 and 340 as shown in FIG. 14A. Side poles 265 and 270 are thus exposed.

A first magnetic pole 345 is patterned at the top of magnetic yoke 145 as shown in FIGS. 14A and 14B. First magnetic pole 345 is fabricated by plating a magnetic material such as NiFe on side pole 265 and on a portion of seed layer 330 adjacent side pole 265. Magnetic control regions 350 and 355, which are adjacent both sides of first magnetic pole 345, may be patterned and plated at the same time as first pole 345. Magnetic control regions 350 and 355 serve to better control local plating current density which influences NiFe composition and enhances the effect of the easy axis magnetic orienting field of between approximately 1000 Gauss to approximately 10,000 Gauss, provided by an external magnet during the first magnetic pole plating step, to give a desired magnetic domain structure in the magnetic pole piece. Head 100 is exposed to the same magnetic field throughout the duration of building up the various magnetic layers thereof.

Figure 15A:
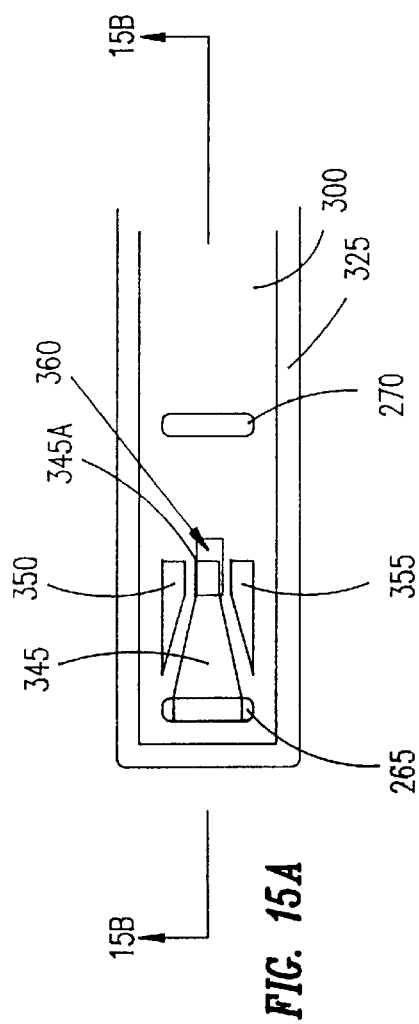
FIG. 15A is a close-up plan view of a portion of the head of FIG. 14A showing the gap region of the head.
Figure 15B:
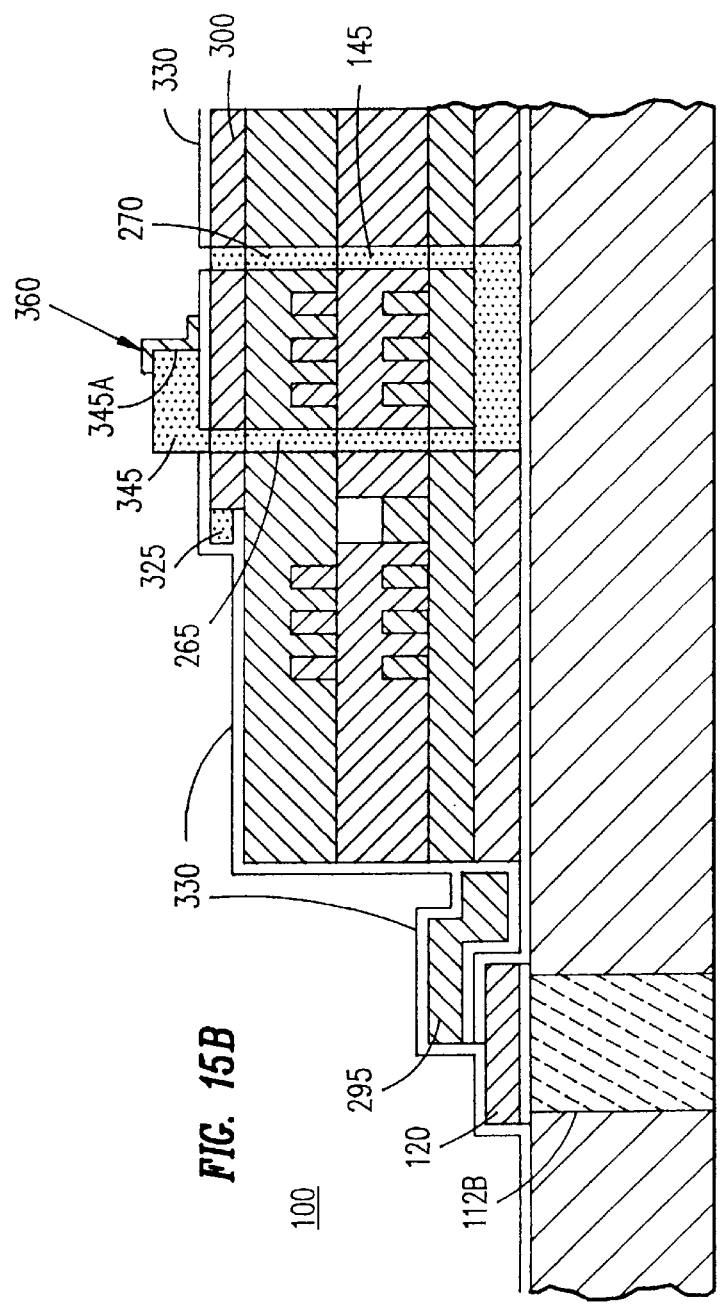
FIG. 15B is a cross sectional view of the magnetic head of FIG. 15A showing the addition of a gap region.

A substantially rectangular gap region 360 of non-magnetic material is patterned adjacent pole end 345A as shown in FIG. 15A and the head cross section of FIG. 15B. One non-magnetic material which may be used to plate gap region 360 on head 100 is NiP. Other non-magnetic materials which are acceptable for plating as gap region 360 are chrome and rhodium, for example. While in this particular embodiment, plating is used to lay down gap region 360, other suitable deposition techniques such as chemical vapor deposition (CVD), patterning and etching unwanted CVD film, may also be employed.

In actual practice, to pattern non-magnetic gap region 360 on head 100, the upper surface of head 100 is coated with photoresist except for the portion shown as gap region 360 in FIG. 15B. More particularly, FIG. 14C illustrates the formation of such a photoresist layer as photoresist layer 362 with an open region 364 in which non-magnetic gap region 360 is to be plated. Non-magnetic material such as NiP is then plated above seed layer 330 and in open region 364 to form gap region 360. In this particular embodiment, gap region 360 is approximately mid way between side poles 265 and 270. Other embodiments are possible wherein gap region 360 is offset either toward side pole 265 or side pole 270.

A second magnetic pole 365 is patterned and plated at side pole 270 at the top of magnetic yoke 145 as shown in FIGS.

16A and 16B. Second magnetic pole 365 includes a pole end 365A which is situated adjacent pole end 345A and which is separated from pole end 345A by gap region 360. It is noted that pole 345 becomes narrower from side pole 265 to pole end 345A. Similarly, pole 365 becomes narrower from side pole 270 to pole end 365A. This gives poles 345 and 365 a bow tie-like appearance in this particular embodiment. Other pole geometries may be used as well. Pole ends 345A and 365A are alternatively referred to as gap ends. First magnetic pole 345 and second magnetic pole 365 exhibit a thickness of approximately 5 $\mu$.

Figure 16A:
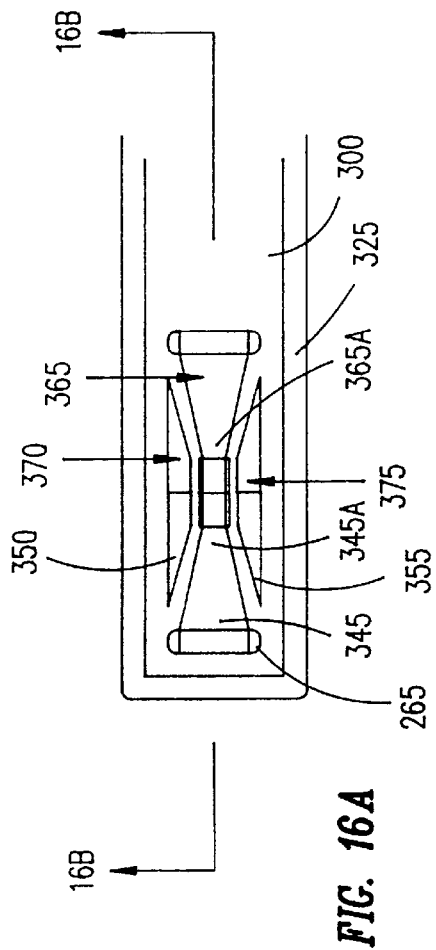
FIG. 16A is a close-up plan view of the side pole and gap region of the magnetic head of FIG. 15A showing the addition of a second magnetic pole at the top of the magnetic yoke structure of the head.

Magnetic control regions 370 and 375 are patterned and plated adjacent both sides of second pole 365 to enhance magnetic control as shown in FIG. 16A. Control regions 350, 355, 370 and 375 are fabricated from a magnetic material such as the material used to fabricate second magnetic pole 365. For optimal wear performance, the area of NiFe exposed to the recording media should be minimized. Thus, to avoid possible magnetic effects that may degrade recording performance, NiFe plated magnetic control regions 350, 355, 370 and 375 are patterned with photoresist and etched away leaving a pole geometry seen in FIG. 17A.

Figure 16B:
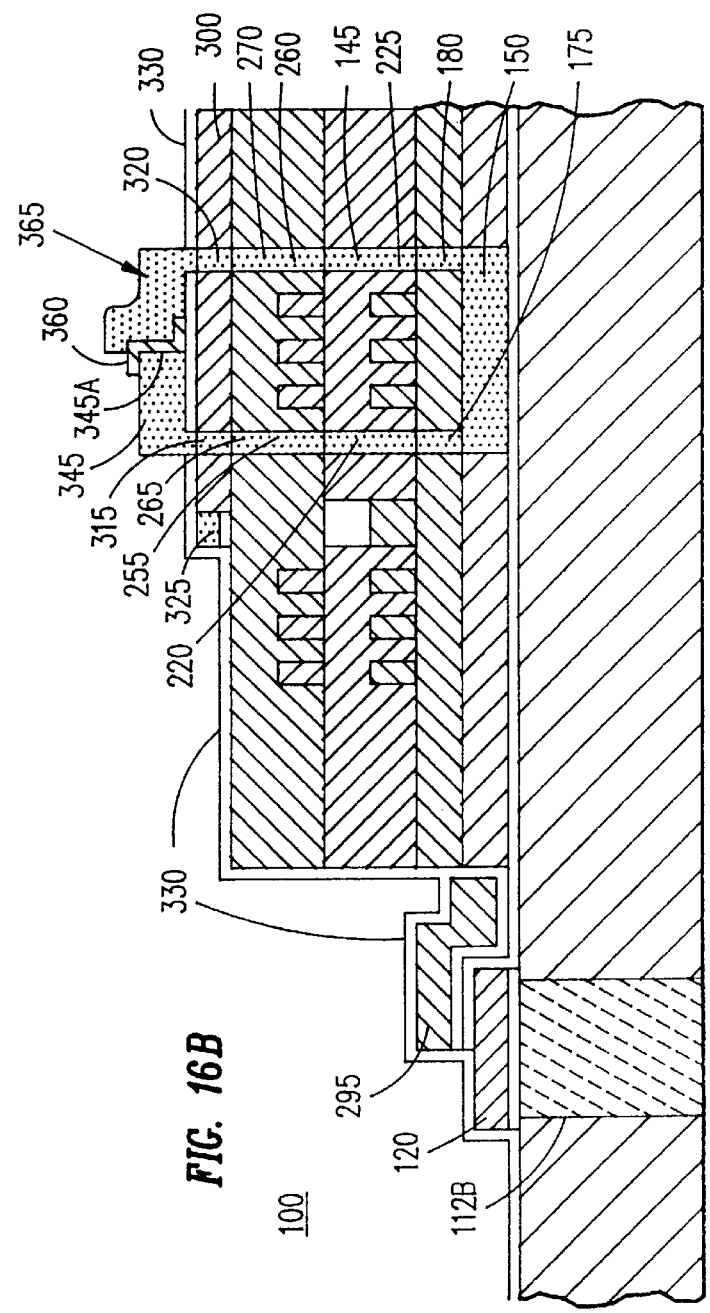
FIG. 16B is a cross sectional view of the magnetic head of FIG. 16A taken along section line 16B—16B and showing the addition of a second magnetic pole.

Magnetic side pole portions 175, 220, 255 and 315 together make up a first side pole which is shown collectively as side pole 265 in FIG. 16B. Magnetic side pole portions 180, 225, 260 and 320 together make up a second magnetic side pole which is shown collectively as side pole 270 in FIG. 16B. Magnetic yoke 145 is collectively made up of bottom magnetic layer 150, side poles 265 and 270, and magnetic poles 345 and 365.

Figure 17A:
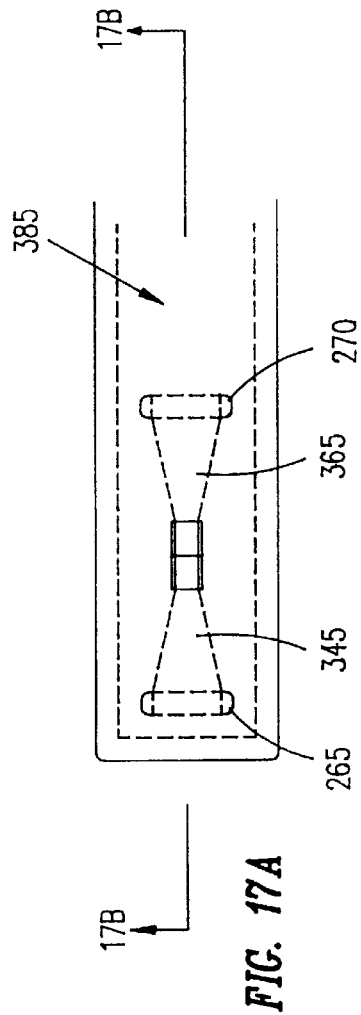
FIG. 17A is a close-up plan view of the side pole and gap region of the magnetic head of FIG. 16A after addition of an adhesion layer and a diamond-like carbon wear layer to the top of the head.
Figure 17B:
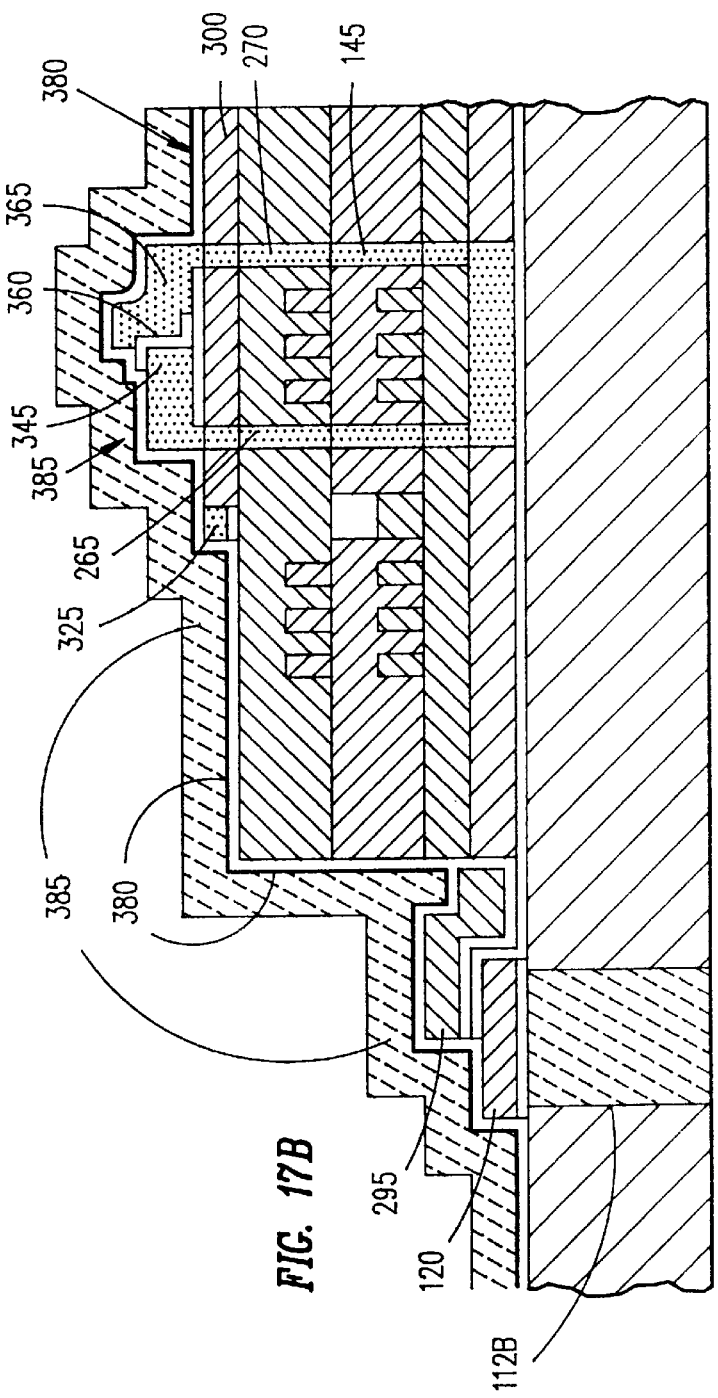
FIG. 17B is a cross sectional view of the magnetic head of FIG. 17A taken along section line 17B—17B.

The exposed seed layer 330 is removed by sputter etching. Alternatively, seed layer 330 is not etched, but is permitted to remain. A silicon adhesion layer 380 is sputtered on the exposed upper surface of head 100 as shown in FIG. 17B. A diamond-like carbon (DLC) protective wear layer 385 is then deposited on adhesion layer 380. Adhesion layer 380 enables DLC layer 385 to stick to the upper surface of head 100. This silicon adhesion layer typically exhibits a thickness within the range of approximately 400 A° to approximately 1000 A°. This silicon adhesion layer exhibits a nominal thickness of approximately 600 A° in a preferred embodiment.

DLC layer 385 covers at least the top of magnetic yoke 145 and the immediately surrounding area of the head. As seen in FIG. 17A and more clearly in FIG. 17B, a hard protective wear layer 385 covers magnetic yoke 145 and insulative pedestal 300. Protective layer 385 exhibits a Knoop hardness greater than 700 Knoop and preferably greater than 800 Knoop. The hardness of protective layer should be within the range of greater than approximately 700 Knoop to approximately 2000 Knoop. One material that is satisfactory for formation of protective wear layer 385 is diamond like carbon (DLC).

Figure 18A:
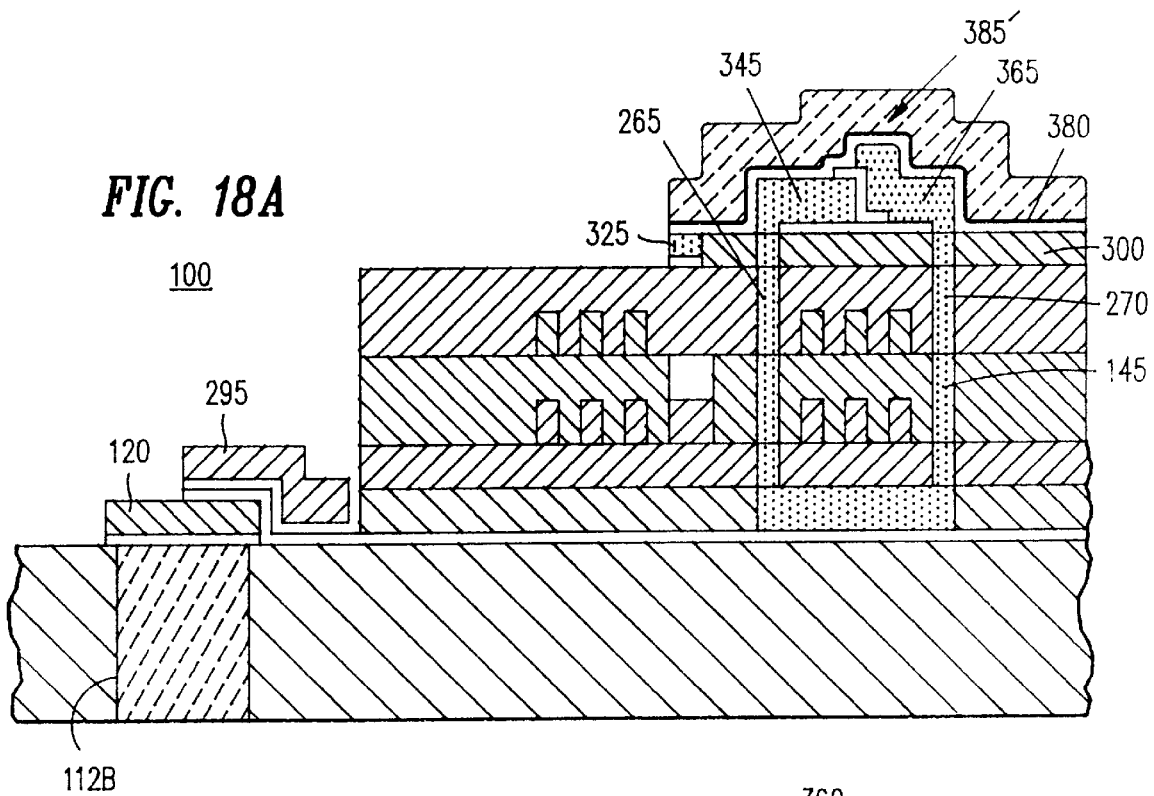
FIG. 18A is a cross sectional view of the magnetic head of FIG. 17B showing the magnetic head after a diamond-like carbon wear layer and adhesion layer are patterned and etched in regions other than the insulative pedestal.

To form such a DLC wear layer 385, DLC layer 385 is chemically vapor deposited and patterned. More specifically, both DLC layer 385 and adhesion layer 380 are reactive ion etched to leave a DLC wear layer 385' over magnetic yoke 145 and insulative pedestal 300 as shown in FIG. 18A. Prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 385 external to frame 325 is etched away and the remaining portion of DLC layer 385 is protected and remains as DLC layer 385'.

An alternative to the above described photoresist masking approach to patterning DLC layer 385 into DLC layer 385' is to cover head 100 with a metal layer such as chromium. For example, a relatively thin photomask layer (not shown) of chromium is sputtered over the DLC layer. In this particular example, the photomask layer is approximately 500 A° thick. The metal photomask layer is photo-patterned and etched to expose DLC areas which are to be excavated by reactive ion etching. The DLC layer is then reactive ion etched to the desired DLC structure.

More detail is now provided with respect to the formation of DLC protective wear layer 385. Before DLC protective wear layer 385 is actually laid down on silicon adhesion layer 380, adhesion layer 380 is sputter cleaned. In the course of performing this sputter cleaning, approximately 200 A° of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20–approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 A/min is obtained which is maintained until the desired DLC thickness is reached, namely approximately 5 $\mu$.

DLC fabricated in this manner results in a DLC layer 385 with a Knoop hardness of approximately 800. It is found that DLC layer Knoop hardnesses of greater than 700 up to approximately 2000 Knoop produce and acceptably hard wear layer 385 for wear protection purposes. DLC wear layer 385 is then reactive ion etched as described to form DLC wear layer 385'.

Figure 18B:
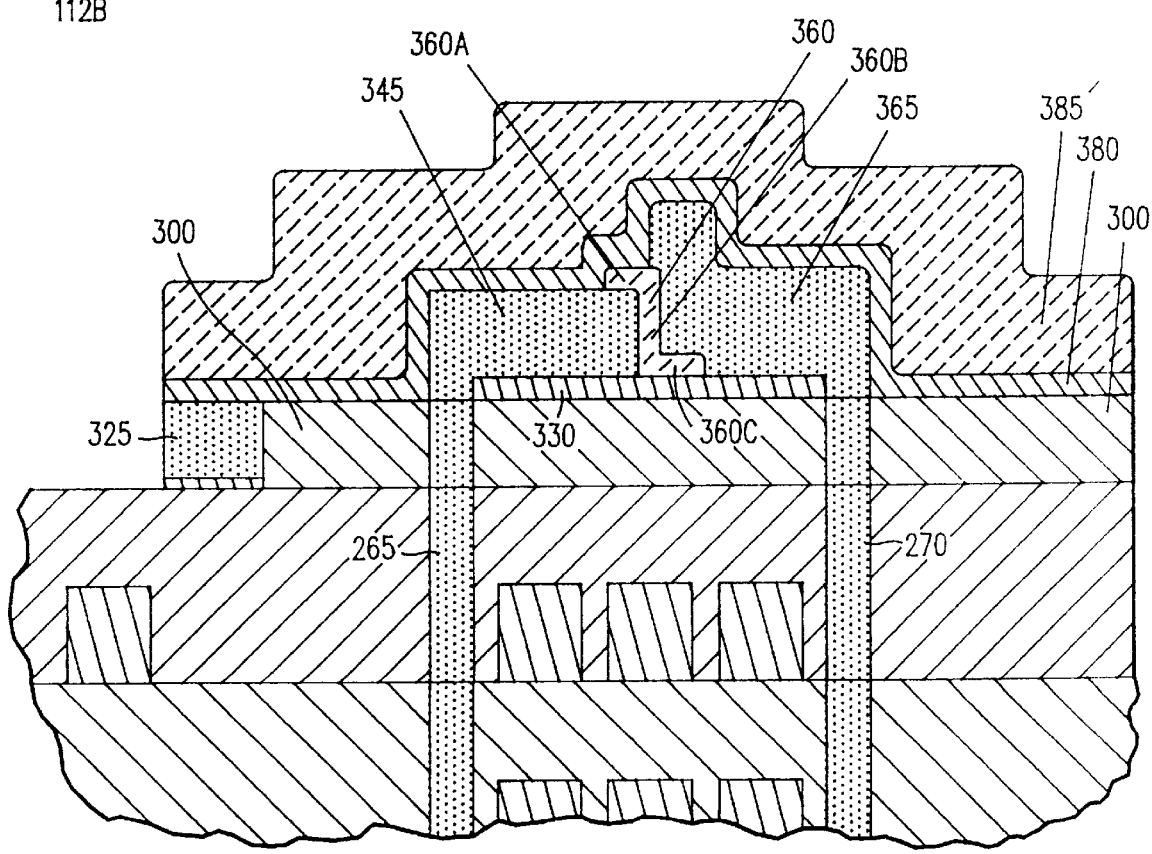
FIG. 18B is a close-up view of the upper portion of the head of FIG. 18A.

FIG. 18B is a close-up view of the upper portion of head 100 at the stage of fabrication depicted in FIG. 18A. In this close-up view, it can be seen that gap region 360 includes a main gap portion 360B which is substantially normal to seed layer 330 and the substrate therebelow. Gap region 360 also includes a top 360A which extends from the uppermost part of main gap portion 360B and generally parallel to seed layer 330 and magnetic pole 345. Top 360A overlies a portion of magnetic pole 345 and extends from main gap portion 360B toward side pole 265. Gap region 360 further includes a bottom portion 360C which extends from the lowermost part of main gap portion 360B and generally parallel to seed layer 330 and magnetic pole 365. Bottom portion 360 underlies a portion of magnetic pole 365 and extends from main gap portion 360B toward side pole 270.

Figure 19C:
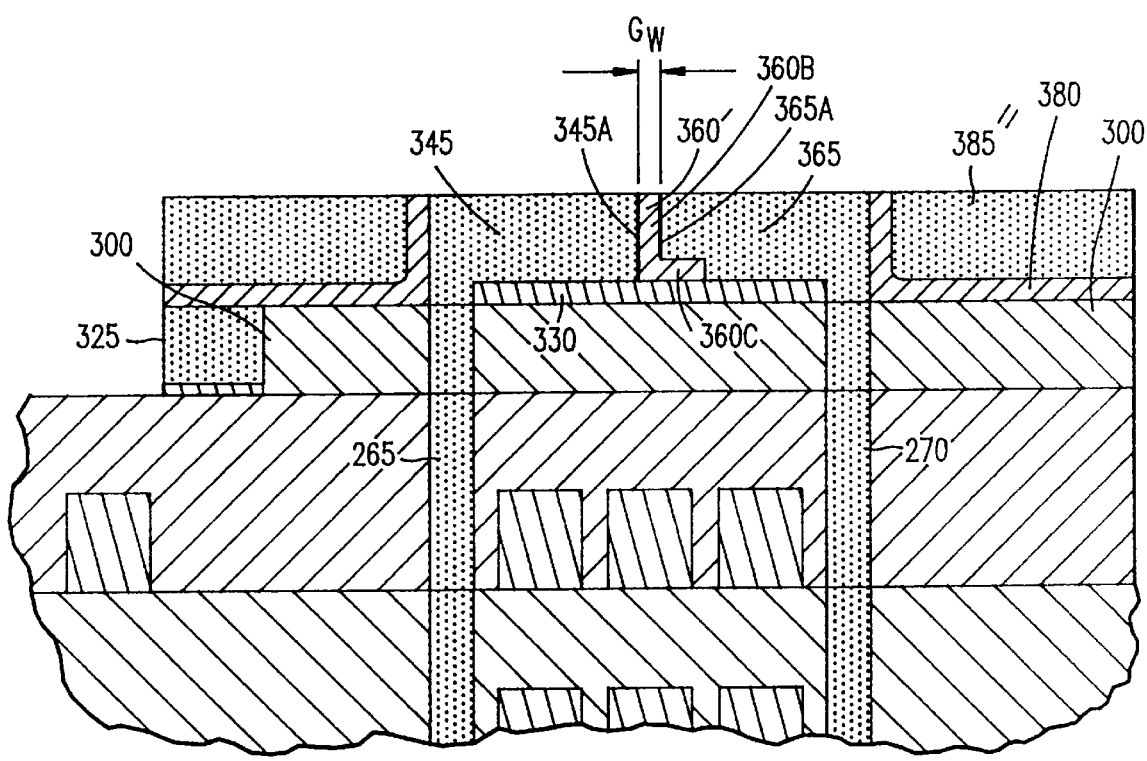
FIG. 19C is a close-up view of the uppermost portion of the head of FIG. 19B

DLC wear layer 385' is machined as shown in FIG. 19B to expose and shape magnetic gap region 360' as shown in both FIG. 19A and 19B. A machined wear layer 385" thus results. The gap region 360' exposed and shaped by this machining step exhibits a substantially L-shaped cross section as seen in FIG. 19B and more clearly in the close-up view of FIG. 19C. DLC wear layer 385" protects head 100, specifically gap region 360 and magnetic poles 345, 365, from wear when head 100 is brought into contact with a magnetic media for recording or playback purposes. Wear layer 385" which is relatively hard compared with the relatively soft gap region 360' and magnetic poles 345 and 365, acts as protective bumper when head 100 comes into contact with the magnetic media. It is noted that in this particular embodiment, the upper surface of wear layer 385 is substantially flush with the upper surface of magnetic poles 345, 365 and gap region 360'. Wear layer 385' surrounds magnetic poles 345, 365 and gap region 385'. Wear layer 385' provides structural support for the magnetic poles 345, 365 and gap region 360' contained within its bounds. In this manner, wear layer 385' contributes to the structural integrity of head 100 and enhances the wear capabilities of the head.

By using the techniques described herein, very narrow gap regions can be produced. The gap width, $W_G$, is defined to be the width of gap region 360, namely the distance between pole end 345A and pole end 365A as seen in FIGS. 19B and 19C. Typical gap widths for head 100 are approximately 0.2 microns to approximately 1 micron.

It is noted that in one embodiment of the invention, the upper magnetic pole elements 345 and 365 are plated directly on magnetic side poles 265 and 270, respectively. Advantageously, no intervening structures are required between upper magnetic pole element 345 and magnetic side pole 265 or between magnetic pole element 365 and magnetic side pole 270.

While a thin film magnetic head apparatus has been described above, it is clear that a method of fabricating such a magnetic head apparatus is also disclosed. Briefly, a method of fabricating a thin film magnetic head is provided which includes the step of depositing a first seed layer on a substrate. The method also includes the step of plating a lower magnetic layer on the first seed layer, the lower magnetic layer having first and second opposed ends, the first seed layer being the seed for plating the lower magnetic layer. The method further includes the step of plating a plurality of layers of magnetic material at the first end of the lower magnetic layer to build-up a first side pole having a first top end, this plating step using the first seed layer as a common seed for the build-up of the plurality of layers of the first side pole. The method includes the step of plating a plurality of layers of magnetic material at the second end of the lower magnetic layer to build-up a second side pole having a second top end, this plating step using the first seed layer as a common seed for the build-up of the plurality of layers of the second side pole. The method also includes the step of forming a coil structure about one of the first and second side poles. The method further includes the step of forming an insulative body about the first and second side poles and the coil structure. The method still further includes the step of forming an insulative pedestal above the insulative body, the first and second top ends extending through the pedestal. The method includes the step of depositing a second seed layer including first and second portions on the insulative pedestal except for the first and second top ends extending through the pedestal. The method also includes the step of depositing a first upper magnetic pole element at the first top end and on the first portion of the second seed layer, the first upper magnetic pole element including a first gap end extending toward the second top end. The method further includes the step of forming a gap region of nonmagnetic material at the first gap end of the first upper magnetic pole element. The method still further includes the step of depositing a second upper magnetic pole element at the second top end and on the second portion of the second seed layer, the second upper magnetic pole element including a second gap end situated adjacent the gap region. The method also includes the step of removing the second layer except for portions of said second seed layer below the first and second upper magnetic pole elements and the gap region. The method further includes the step of forming a diamond-like carbon (DLC) frame above the insulative pedestal and surrounding the first and second upper magnetic pole elements and gap region to provide structural integrity to the head and wear protection therefor.

The foregoing has described a thin film magnetic head in which the lower element of the magnetic yoke and two side poles are built up from a common seed layer, namely seed layer 130. The disclosed head desirably exhibits enhanced wear characteristics. Advantageously, the disclosed thin head achieves a very narrow gap width which results in correspondingly high density magnetic recording capabilities. The thin film head can be fabricated without excavating a recess within the substrate to contain the head. Moreover, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A method of fabricating a thin film magnetic head comprising:

depositing a first seed layer on a substrate having a substantially planar surface;

plating a lower magnetic layer on the first seed layer, the lower magnetic layer having first and second opposed ends, the first seed layer being the seed for plating the lower magnetic layer;

plating a plurality of layers of magnetic material at the first end of the lower magnetic layer to build-up a first side pole stacked so that the plurality of layers form a first column in a direction perpendicular to the substrate surface and having a first top surface, this plating step using the first seed layer as a common seed for the build-up of the plurality of layers of the first side pole;

plating a plurality of layers of magnetic material at the second end of the lower magnetic layer to build-up a second side pole stacked so that the plurality of layers form a second column in a direction perpendicular to the substrate surface and having a second top surface, this plating step using the first seed layer as a common seed for the build-up of the plurality of layers of the second side pole;

forming a coil structure about one of the first and second side poles;

forming an insulative body about the first and second side poles and the coil structure;

forming an insulative pedestal in a generally horizontal plane overlying the insulative body and extending laterally to fully enclose the first and second side pole top surfaces;

forming a first aperture in the insulative pedestal overlying the first side pole and a second aperture in the insulative pedestal overlying the second side pole;

plating a layer of magnetic material overlying the first side pole extending through the first aperture in the insulative pedestal and plating a layer of magnetic material overlying the second side pole extending through the second aperture in the insulative pedestal;

depositing a second seed layer including first and second portions on the insulative pedestal leaving undeposited the layers of magnetic material of the first and second side poles extending through the first and second apertures;

depositing a first upper magnetic pole element at the first top surface, integrally, directly and magnetically coupled to the first side pole, and on the first portion of the second seed layer, the first upper magnetic pole element including a first gap end extending toward the second top surface;

forming a gap region of nonmagnetic material at the first gap end of the first upper magnetic pole element;

depositing a second upper magnetic pole element at the second top surface, integrally, directly and magnetically coupled to the second side pole, and on the second portion of the second seed layer, the second upper magnetic pole element including a second gap end situated adjacent the gap region;

removing the second seed layer except for portions of said second seed layer below the first and second upper magnetic pole elements and the gap region; and forming a diamond-like carbon (DLC) frame above the insulative pedestal and surrounding the first and second upper magnetic pole elements and gap region to provide structural integrity to the head and wear protection therefor.

2. The method of claim 1 further comprising depositing an adhesion layer on the head prior to the step of forming a DLC frame.

3. The method of claim 1 wherein forming the DLC frame includes:

depositing a DLC layer on the pedestal; and machining the DLC layer, the first and second magnetic pole elements and the gap region to expose the first and second magnetic pole elements and the gap region.

4. The method of claim 3 wherein depositing a DLC layer on the pedestal includes:

depositing a DLC coating over the pedestal and insulative body;

reactive ion etching the DLC coating to remove the DLC coating except for the portion thereof above the insulative pedestal.

5. The method of claim 1 further comprising:

forming the gap region by plating the gap region.

6. The method of claim 1 wherein the gap region exhibits a substantially L-shaped form in a cross-sectional plane perpendicular to the substantially planar surface of the substrate and extending through the first and second side poles.

7. A method of fabricating a thin film magnetic head comprising:

electroplating a magnetic material to form a lower pole member on a substrate having a substantially planar surface, the lower pole member having first and second ends;

forming a common seed layer on the first and second ends of the lower pole member;

electroplating a plurality of layers of the magnetic material, layer upon layer in a direction perpendicular to the substrate surface, to form first and second side pole members at the respective first and second ends of the lower pole member overlying the common seed layer, the individual layers of the plurality of layers of the magnetic material being the same size and shape and stacked directly connecting with a preceding layer so that the plurality of layers form a column, both the first and second side pole members including a top surface and a bottom surface, the common seed layer being common to each layer of the plurality of layers of the magnetic material;

depositing a plurality of layers of an electrically insulative material to form an insulative body about the first and second side poles, the layers of the insulative material being built up in the insulative body alternately with a build-up of the layers of the magnetic material in the side pole members;

depositing a plurality of coil layers to form first and second conductor coils having a plurality of coil segments that are mutually insulated by the layers of electrically insulative material within the insulative body, the first and second conductor coils being wound to encircle the first and second side pole members, respectively, the plurality of coil layers being built up alternately with the build-up of layers of the insulative body and layers of the magnetic material in the side pole members;

depositing an insulative pedestal disposed in a plane substantially parallel to the planar surface of the substrate and generally overlying the first and second pole members and extending laterally so that top surfaces of the first and second side pole members are completely enclosed within an exterior boundary of the insulative pedestal;

etching a first aperture and a second aperture in the insulative pedestal respectively overlying the first side pole member and the second side pole member so that the top surfaces of the first and second pole members are exposed through the insulative pedestal;

electroplating a magnetic material to form a first magnetic pole and a second magnetic pole overlying the insulative pedestal, the first magnetic pole being integrally, physically, and magnetically coupled to the first side pole and extending from the first side pole toward the second side pole, the second magnetic pole being integrally, physically, and magnetically coupled to the second side pole and extending from the second side pole toward the first magnetic pole;

depositing a non-magnetic material in a gap region separating the first and second magnetic poles;

forming a diamond-like carbon (DLC) frame extending laterally in a plane substantially parallel to the planar surface of the substrate and overlying the insulative pedestal, the DLC frame laterally enclosing the first and second magnetic poles; and planarizing the DLC frame, the first and second magnetic poles, and the gap region to form a substantially flush upper surface so that the DLC frame supplies structural integrity to the head and wear protection for the enclosed magnetic poles and gap region.

8. The method according to claim 7 further comprising:

forming the gap region in substantially an L-shape in a cross-sectional plane substantially perpendicular to the planar surface of the substrate and intersecting the first and second side poles.

9. The method according to claim 7 further comprising:
depositing an adhesion layer situated between the pedestal and the DLC frame.

10. The method according to claim 7 further comprising:
forming the DLC frame to a substantially rectangular geometry.

11. A method of fabricating a magnetic read/write head apparatus comprising:

forming a first seed layer on an insulative substrate having a substantially planar surface;

depositing a magnetically permeable material on the first seed layer to form a first pole piece, the first pole piece having a generally parallel orientation with respect to the substantially planar surface of the substrate;

depositing the magnetically permeable material on a first end of the first pole piece to form a second pole piece integral with the first pole piece in a sequence of levels overlying the first pole piece and stacked in a direction perpendicular to the insulative substrate surface using the first seed layer as a common seed layer, the second pole piece having a generally perpendicular orientation with respect to the substantially planar surface of the substrate and including a plurality of stratified integrated layers all having substantially the same size and shape to form a columnar structure and each layer being directly connected with a preceding layer, the second pole piece including a top surface, the first seed layer being common to each layer of the plurality of integrated layers of the second pole piece;

depositing the magnetically permeable material on a second end of the first pole piece to form a third pole piece integral with the first pole piece in a sequence of levels overlying the first pole piece and stacked in a direction perpendicular to the insulative substrate surface using the first seed layer as a common seed layer, the third pole piece having a generally perpendicular orientation with respect to the substantially planar surface of the substrate and including a plurality of stratified integrated layers all having substantially the same size and shape to form a columnar structure and each layer being directly connected with a preceding layer, the third pole piece including a top surface, the first seed layer being common to each layer of the plurality of integrated layers of the third pole piece;

depositing an insulative body overlying the substrate and enclosing the second and third pole pieces in a plurality of layers of an electrically insulative material, the layers of the insulative material being built up in the insulative body alternately with a build-up of the stratified integrated layers of magnetic material in the second pole piece and the third pole piece;

forming an insulative pedestal situated above the insulative body;

etching a plurality of apertures for extending the top surfaces of the second and third pole pieces, the insulative pedestal enclosing the top surfaces of the second and third pole pieces peripheral to the apertures;

depositing a second seed layer on the insulative body between the second and third pole pieces, the second seed layer having first and second portions;

depositing a layer of the magnetically permeable material integrally, directly and magnetically coupled with the second pole piece and disposed on the first portion of the second seed layer to form a fourth pole piece;

depositing a layer of the magnetically permeable material integrally, directly and magnetically coupled with the third pole piece and disposed on the second portion of the second seed layer to form a fifth pole piece;

etching a gap region between the fourth and fifth pole pieces, the gap region having a generally normal orientation with respect to the substrate and being fabricated from a non-magnetic material; and depositing a diamond-like carbon (DLC) frame formed overlying the insulative pedestal and laterally surrounding the fourth and fifth pole pieces and the gap region, the DLC frame, the fourth and fifth pole pieces, and the gap region having a substantially flush upper surface so that the DLC frame supplies structural integrity to the head and wear protection for the enclosed magnetic poles and gap region.

12. The method according to claim 11 further comprising:

forming a first coil structure encircling the second pole piece, the coil structure including a plurality of coil layers mutually insulated by the layers of the electrically insulative material within the insulative body, the individual coil layers of the plurality of coil layers being stacked so that the plurality of coil layers form columns in the direction perpendicular to the substrate surface, the columns being mutually separated by the electrically insulative material of the insulative body, the plurality of coil layers being built up alternately with the build-up of layers of the insulative body and layers of the magnetic material in the second pole piece and the third pole piece.

13. The method according to claim 12 further comprising:

forming a second coil structure encircling the third pole piece, the coil structure including a plurality of coil layers mutually insulated by the layers of the electrically insulative material within the insulative body, the individual coil layers of the plurality of coil layers being stacked so that the plurality of coil layers form columns in the direction perpendicular to the substrate surface, the columns being mutually separated by the electrically insulative material of the insulative body, the plurality of coil layers being built up alternately with the build-up of layers of the insulative body and layers of the magnetic material in the second pole piece and the third pole piece.

14. The method according to claim 11 further comprising:
etching the gap region in a substantially L-shaped form in a cross-sectional plane perpendicular to the substantially planar surface of the substrate.

15. The method according to claim 11 further comprising:
forming an adhesion layer between the pedestal and the DLC frame.

16. The method according to claim 11 further comprising:
depositing the DLC frame in a substantially rectangular geometry.

17. The method according to claim 11 further comprising:
etching the gap region on the second seed layer between the first portion and the second portion of the second seed layer.

18. The method according to claim 11 further comprising:
forming the DLC frame to a hardness greater than approximately 700 Knoop.

19. The method according to claim 11 further comprising:
forming the DLC frame to a hardness in a range from approximately 800 Knoop to approximately 2000 Knoop.

* * * * *